(12) United States Patent
Kantajaraniti et al.

(10) Patent No.: US 8,773,252 B2
(45) Date of Patent: Jul. 8, 2014

(54) GEAR LEVER LOCKING DEVICE

(75) Inventors: Kamol Kantajaraniti, Bangkok (TH); Somchai Tiemsiriwat, Chonburi (TH)

(73) Assignees: Kamol Kantajaraniti, Bangkok (TH); Somchai Tiemsiriwat, Chonburi (TH); Suwat Petcharapirat, Prachuapkhirikhan (TH)

( * ) Notice: Subject to any disclaimer, the term of this patent is extended or adjusted under 35 U.S.C. 154(b) by 109 days.

(21) Appl. No.: 13/266,235

(22) PCT Filed: Dec. 3, 2010

(86) PCT No.: PCT/TH2010/000046
§ 371 (c)(1),
(2), (4) Date: Oct. 25, 2011

(87) PCT Pub. No.: WO2011/068484
PCT Pub. Date: Jun. 9, 2011

(65) Prior Publication Data
US 2012/0229265 A1    Sep. 13, 2012

(30) Foreign Application Priority Data

| Dec. 4, 2009 | (TH) | 0901005450 |
| Dec. 4, 2009 | (TH) | 0901005451 |
| Dec. 4, 2009 | (TH) | 0901005452 |
| Dec. 4, 2009 | (TH) | 0903001406 |
| Aug. 23, 2010 | (TH) | 1001001282 |

(51) Int. Cl.
*B60Q 1/00* (2006.01)

(52) U.S. Cl.
USPC ...... 340/456; 340/426.11; 70/247; 74/473.22

(58) Field of Classification Search
USPC ............... 340/426.11, 426.1, 426.34, 426.24, 340/456; 477/99, 166; 70/247, 248, 245, 70/202, 237; 74/473.22, 473.24
See application file for complete search history.

(56) References Cited

U.S. PATENT DOCUMENTS

| 1,378,308 A | 5/1921 | Adams |
| 1,525,993 A | 2/1925 | Hurd |
| 1,791,807 A | 2/1931 | Doane |
| 3,810,369 A * | 5/1974 | Giovanniello .................. 70/202 |

(Continued)

OTHER PUBLICATIONS

PCT International Search Report and Written Opinion of the International Searching Authority; PCT International Application No. PCT/TH2010/000046, Dated May 12, 2011; 10 pages; International Searching Authority/European Patent Office.

*Primary Examiner* — Brent Swarthout
(74) *Attorney, Agent, or Firm* — Murabito, Hao & Barnes LLP; Andrew D. Fortney

(57) ABSTRACT

A gear lever locking device to be installed inside a gear lever cover panel is characterized in that it comprises an auxiliary connector transverse stud and a gear lever connector which is slidable in accordance with the movement of a gear lever. On an auxiliary connector, there is provided a plurality of stud holes for use with a gear lever transverse stud having a stud end pushing mechanism. The stud end pushing mechanism receives the force exerted from a locking mechanism by a pressing means. The gear lever locking device according to the present invention includes screw guards and a cover wall that have been designed to cover a locking mechanism installation portion to prevent any removal of fastening screws or a gear sling, to prevent disassembling or breaking of the locking mechanism of the gear lever locking device to improve safety.

9 Claims, 28 Drawing Sheets

(56) References Cited

U.S. PATENT DOCUMENTS

| | | |
|---|---|---|
| 4,679,417 A | 7/1987 | Van Cise, Jr. |
| 4,905,802 A | 3/1990 | Gotoh |
| 5,566,583 A | 10/1996 | Suzuki |
| 6,176,809 B1 | 1/2001 | Visser et al. |
| 6,708,536 B1 * | 3/2004 | Yu .................................. 70/199 |
| 2001/0013237 A1 * | 8/2001 | Kataumi et al. ................. 70/247 |
| 2009/0151412 A1 * | 6/2009 | Chung et al. .................... 70/247 |

* cited by examiner

GEAR LEVER LOCKING DEVICE

BACKGROUND OF THE INVENTION

The present invention relates generally to a gear lever locking mechanism for a vehicle. In particular, the present invention relates to a gear lever locking mechanism mountable directly onto a gear lever housing frame of a vehicle to lock movement of the vehicle's gear lever.

Conventional gear lever locking devices include a mechanism for locking a typical gear lever of an automobile. The typical gear lever locking device is a loop member for use in locking the gear lever only in one particular position according to the installation position. In addition, the aforementioned gear lever locking device's loop member may be unlocked by an unlocking key system. However, conventional gear lever locking devices have an operational drawback. That is, if a user wants to shift the locking position of the gear lever from the parking position (P position) to the neutral position (N position), it is impossible to shift the gear lever to the position that meets the operational requirements. Moreover, the commonly used or commercially available locking device is installed outside the gear lever cover panel, thereby deteriorating the outer appearance of the gear lever locking device installed in the vehicle, or exposing the device to become more easily damaged, and or inhibiting sufficient convenience during its usage.

Moreover, gear lever locking devices are typically required to be permanently installed alongside the gear lever. Sometimes, the installation in this manner can make the user feel that these members obstruct the steering of the automobile and possibly lead to an unexpected accident. If the device is a detachable type after being unlocked, then the detached member has to be placed in a proper place so that it will not interfere with the driver, which is inconvenient. In addition, sometimes the installation of the gear lever locking device requires some modifications to the components that have originally been installed in the automobile or other vehicle.

Thus, there is still a need for an automobile gear lever locking device capable of locking a gear lever that addresses the aforementioned problems of conventional mechanical anti-theft devices. Such a need is satisfied by the automobile gear lever locking device of the present invention.

BRIEF SUMMARY OF THE INVENTION

In a first aspect, the present invention provides a gear lever locking device which will be installed inside the gear lever covering panel. The gear lever locking device includes an auxiliary connector with the gear sling or a gear lever connector which is slidable in accordance with the movement of the gear lever. On the auxiliary connector, there is provided a plurality of stud holes for use with the gear lever transverse stud having a stud end pushing mechanism. The stud end pushing mechanism receives the force exerted from the locking mechanism by the pressing means. The gear lever locking device according to the present invention includes screw guards and a cover wall that have been designed to cover the locking mechanism installation portion to prevent any removal of the fastening screws or the gear sling to prevent disassembling or breaking of the locking mechanism of the gear lever locking device.

The gear lever locking device to be installed inside a gear lever cover panel. The gear lever locking device is characterized in that it comprises a cover wall snugly fitted to cover the locking mechanism and the connector, wherein the lower edge of the cover wall is coupled with the fixing leg member and the fixing leg. The fixing leg member and the fixing leg are bent members with at least three protruding ends in the positions that correspond to the original mounting screws in the automobile. The protruding ends of the first fixing leg member and the second fixing leg include a pipe or a screw hole mounted to the vehicle in the original position of the vehicle connected to a gear lever. On a first fixing leg member and a second fixing leg, there are provided screw guards. The screw guards are complementary in shape and closely cover the screws that fasten the first fixing leg member and the second fixing leg. The above-mentioned screw guards are fastened to the first fixing leg member and the second fixing leg using screw guard fastening screws. The latter process is carried out while the gear lever locking device is in the unlocked position. Subsequently, the screws may be used in fastening the screw guards with the aid of mechanical tools. However, it is impossible to use the mechanical tools to fasten the screws with the screw guards if the gear lever locking device is in the locked position.

The aforementioned connector is a cast metal member, one end of which comprises a pair of parallel flat protrusions. The fixing ends thereof are provided with respective holes for use in fixing to the coupling part of the original gear lever or gear sling, or the gear sling end connected to the original gear lever. At least a part of the other end of the connector is provided with a hole or a concaved notch for use in locking to the end of the second locking stud of the locking mechanism to inhibit any movement of the gear lever.

The lateral portion of the cover wall defined for the installation of the second locking stud is provided with a spring mounting opening inside of which the second locking stud is slidable. The outer end of the second locking stud includes the first stud of a turning mechanism arranged inside the locking mechanism body. The first stud is actuated to push the second locking stud to be locked to the groove of the side of the cover wall designated for the mounting of the second locking stud. There is provided an opening used in mounting a spring. The spring is slidable therein. The second locking stud includes the first stud of the locking mechanism arranged inside the locking mechanism body. The first stud is actuated to push the stud to be locked to the groove or the hole on the auxiliary connector into the locked condition. The stud slides out of the groove or the hole on the auxiliary connector while unlocking the first stud inside the locking mechanism body to which the return spring is mounted. The spring will push the body of the locking mechanism out of its position. The outer end of the locking mechanism body is mounted to the locking mechanism having the first stud arranged inside the first stud sheath. The stud sheath may be actuated by the locking mechanism. The first stud is locked to the locking mechanism body to prevent the retreating movement of the second locking stud. Moreover, the locking mechanism comprises a key used for unlocking.

In a second aspect, the present invention provides a gear lever locking device which will be installed inside a gear lever covering panel. The gear lever locking device includes a gear lever transverse stud which is slidable into a through hole of the auxiliary connector to handle the locking with at least one position of a stud hole.

The gear lever transverse stud has a stud end pushing mechanism that receives the force exerted from the locking mechanism by a turning means that actuates the locking via a cam or pressing means. The lock handling auxiliary connector is a cast mechanism part for use in engaging with the end of the gear lever sling end connecting plate. The engagement is formed in such a manner that the anchored connection point is pivotal. The pivotal anchored connection point allows the movement of the lock handling auxiliary connector in various positions in accordance with the stud end located inside the lateral groove of the lock handling auxiliary connector. The gear lever locking device according to the present invention includes the screw guards that have been designed to prevent any removal of the fastening screws or the gear sling to prevent disassembling or breaking of the locking mechanism of the gear lever locking device.

The gear lever locking device comprises a stud chamber having an upper cover and is connected to the locking mechanism. The stud chamber is shaped in accordance with the inner space of the gear lever covering panel. The lower part of the stud chamber is detachably attached to a fixing base. The inner space of the stud chamber is the stud mounting portion and the stud pushing mechanism arranged internally in a correspondent manner. The stud end is inserted through the through hole at the end of the stud chamber to be locked with the auxiliary connector and slides back by the force exerted from the return spring mounted on the stud and the stud pushing mechanism, respectively. One part on the lateral side of the stud includes an auxiliary connector protruding through the opening on the lateral side of the stud chamber to slide to obscure the screws fastening the screw guard. This will prevent the removal of the fixing legs of the gear lever locking device when the latter is in the locked position. The end adjacent to the stud connected with the cover wall member cast covers a portion of the sling end connector.

In addition, the sling retaining plate and the lower part of the gear lever locking device comprises a number of fixing legs along with the fastening screws. The screw holes on the upper fixing legs have the upward extending pipe covering the screw head and handling the closing insertion of the cylindrical pipe at the lower end of the screw guard in a position that corresponds to the leg retaining screw hole.

The locking mechanism or the turning mechanism is installed inside the locking mechanism chamber with the fastening means mounted in the locking mechanism chamber and connected with the end of the side of the stud chamber where the stud pushing mechanism is located. The lock pressing mechanism includes a pin end for use in moving the end of the stud pushing mechanism and the lower part of the locking mechanism chamber still has a return spring.

The auxiliary connector is an iron plate provided with at least one through hole for the insertion of the stud end to block in the locked position at the P or N position of the transmission. A portion on one end is used as the mounting portion to be fixed to the groove end of the conventional rotatable sling end retaining plate. There is a groove at the lateral side of the auxiliary connector at the side connected to the stud for use in receiving the stud end in such a manner that the end of the auxiliary connector does not abut the vehicle floor or the vehicle's mechanism. Alternatively, the auxiliary connector is an iron plate provided with at least one hole for the insertion of the stud end to block in the locked position. A portion on one end is used as the fixing portion with the gear sling end connected to the gear lever.

Further, one portion on the screw guard comprises the openings for use in engaging with the stud head fastened at the upper part of the fixing leg in the correspondent positions as a mechanism in fastening the screw guard. The end of the stud pushing mechanism at which part connected to the mechanical pin of the lock pressing mechanism is the inclined or curved plane used in abutting the inclined plane of the mechanical pin of the lock pressing mechanism to move the end of the stud pushing mechanism. In addition, on the stud pushing mechanism, there is provided a spring groove inside of which is installed with the return spring to help in pushing the stud pushing mechanism backward when the gear lever locking device is unlocked.

In a third aspect, the present invention provides a gear lever locking device that includes a gear lever transverse stud which is slidable into a through hole on a sliding axle used in locking with a stud hole provided in at least one position. The gear lever transverse stud has a stud end pushing mechanism that receives the force exerted from the locking mechanism by a turning means or pressing means. The sliding axle is a tubular sliding axle with a bent end engaged with a gear lever sling end or a gear lever sling end connecting plate. This will allow the sliding axle to move to various positions in accordance with the stud end located inside the controlling groove. The gear lever locking device according to the present invention includes screw guards that have been designed to prevent any removal of the fastening screws or the gear sling to prevent disassembling or breaking of the locking mechanism of the gear lever locking device.

The gear lever locking device is to be installed inside the gear lever cover panel. The gear lever locking device comprises an axle pipe to be mounted to the sliding axle the front end of which is curvedly bent while its tip is provided with an engagement member to be engaged with a gear lever sling end retaining plate or engaged with a gear lever sling end. The rear end is provided with a hole in a sliding position corresponding to the P position or the N position to support the locking stud end of a locking mechanism unit extending through the through hole on an axle pipe. The lower front part of the axle pipe is provided with a fixing leg along with a flange and a cast bent screw hole extending downward to be engaged with the original screw of the automobile. At the rear end of the flange of the fixing leg, there is provided an extension member upwardly extending to be engaged with a portion of the axle pipe. The flange is also coupled to a lower part of an upper cover that covers a portion above the front end of the sliding axle to prevent its destruction. At the other part of the upper cover plate, there is a fixing leg extending downwardly.

At the lower part of the rear end of the axle pipe, there is a fixing leg having a flange facing downwardly. In addition, the lateral portion of the rear end of the axle pipe also comprises locking mechanism unit of which lateral part of the fastening stud chamber connected to the lateral side of the axle pipe on the opposite side of the stud chamber including a turning mechanism with the end pushing stud of the locking stud used in pushing the lock when the locked is pressed or the turning mechanism is turned by the key.

At the lateral side of the stud axle, there is a fixing leg extending downwardly. The fixing leg has a flange along with a screw hole. A screw guard is provided on the flange of the fixing leg. A number of ends of the screw guard are bent into the shape that completely covers the screw head. One end of the screw guard is bent to be adjoined to the fixing leg. The screw guard and the fixing leg are connected by fastening means such as, screws, studs, etc. One portion on the lateral side of the locking mechanism unit is provided with an extension member extending through a lateral opening. The extension member is operated to cover the screw to prevent the removal of the fixing leg fastening screws of the gear lever locking device while in the locked position. In addition, the fixing leg comprises a screw guard used in preventing the removal of the fixing leg fastening screws and connecting to the fixing leg by means of the screws. The screw guard is functional in the position that the front portion of the end of the sliding axle slides into the position that covers the screws when the sliding axle is in the corresponding position as the P gear or N gear while the gear lever locking device is in the locked position.

The turning mechanism or the lock pressing mechanism is installed inside the locking mechanism chamber connected with the stud chamber having the stud pushing mechanism. The turning mechanism comprises a driving pin end used in pushing the end of the stud pushing mechanism. Alternatively, the turning mechanism includes a key for use in turning to lock or unlock the gear lever locking device into the locking or unlocking position, respectively.

In accordance with a fourth aspect, the present invention provides a gear lever locking device comprising a sliding axle chamber inside of which the sliding axle is slidable, and a locking mechanism unit having a turning mechanism, which is turnable by a key, wherein the a turning mechanism is arranged inside the locking mechanism chamber attached to a lateral side of the sliding axle chamber for use in driving a locking stud to a stud hole on the sliding axle when the gear lever locking device is in the locked position. A gear lever transverse mechanism unit is attached next to the other end of the sliding axle. A vertical leg unit extends from the wall outside a portion of the sliding axle chamber for use in fastening to the original position of the screw of the automobile. The gear lever transverse mechanism unit is a loop member inside of which is provided with a transverse slot, one side of which is a round slot. The round slot is bigger than a continuous lateral slot for use in hooking with the gear lever. The side of the loop is provided with the extension strap to be fastened to a part having a screw fastened to the screw hole on the connector using a screw.

The gear lever locking device is shown comprising a sliding axle chamber having a sliding axle which is slidable therein; locking mechanism unit having a turning mechanism, which is turnable by a key inside the locking mechanism chamber attached to the lateral side of the sliding axle chamber for use in driving the locking stud to be locked with the stud hole in the sliding axle while the gear lever locking device is in the locked position; a gear lever transverse member coupled to the other end of the sliding axle, seat units extending from part of the outer wall of the sliding axle chamber to be fastened to the original positions of the screws in the automobile, wherein the gear lever transverse mechanism unit is a loop member inside of which is provided with the transverse slot, one side of which is a round slot. The round slot is bigger than the continuous lateral slot for use in hooking with the gear lever. The side of the loop is provided with the extension strap to be fastened to the part having a screw fastened to the screw hole on the connector using a screw.

The sliding axle chamber further comprises an opening at the lateral side for use with the axle extending from the sliding axle in the position that corresponds to the position of the screw that fastens the screw guard in one position. The sliding axle chamber in shaped into the round or box pipe while the sliding axle is in the form of a rod to match the internal configuration of the sliding axle chamber.

The abovementioned locking mechanism is arranged inside the locking mechanism chamber coupled with the lateral side of the sliding axle chamber. The locking mechanism comprises a turning mechanism having a turning axle extending to the locking stud provided inside the stud body in the position that the end groove of the stud, and the rear end of the stud includes a stud pushing spring for use in driving the stud to allow the sliding of the end to be engaged with the stud hole on the sliding axle while the gear lever locking device is in the locked position.

Seat units extend from the outer wall on a portion of the sliding axle chamber wherein a number of the seat ends include cylindrical screw chambers in the positions that correspond to the original positions of the screws in the automobile for use in fastening the seats to the original screws of the automobile. The upper seat units include screw guards cut into the shape that matches the upper part of the seat and are fastened to the seat via the screws for use in fastening the screw guards. At least one screw is positioned in the lower part and in the correspondent position with the axle when the gear lever locking device is in the locked position.

In accordance with another aspect of the present invention, the gear lever locking device comprises a sustaining axle. The sustaining axle is a bent member, one end of which engaged with the end of the sliding axle. The other end is engaged with the sustaining axle pipe fixed to the sliding axle chamber in the position that the end of the sustaining axle can move to obscure the screw fastening the screw guard. In addition, there is also an intermediate pipe to prevent the striking between the sustaining axle and the inner part of the sustaining axle pipe. This will avoid the undesired noise from the gear lever locking device. At the portion between the seats, there is a diaphragm cut into the downward protruding shape suitable for closing the lower gap between the sliding axle and the body of the automobile.

In accordance with a fifth aspect, the present invention provides at least one of an alarm system and an anti start system as an additional anti-theft/security systems to further prevent the vehicle from theft. The alarm system includes a micro switch set, an electronic security system, and an audible alarm device. The micro switch set is attached via the through hole on the lateral side of the turning mechanism.

The turning mechanism is configured to include the micro switch set having a key code member with a protrusion for use in extending through a through hole to a micro switch installed on the body of the locking mechanism when the key is inserted into the locking mechanism for turning and unlocking the gear lever locking device. The micro switch is the mechanism used in supplying an electric current to activate the electronic security system of the alarm system to emit a code signal wave to determine a corresponding code signal wave of the key having a signal code storage device attached thereto or embedded therein. If the code signal from the key matches the code signal from the electronic security system installed inside the vehicle, the alarm system will not be triggered to sound the audible alarm device. However, if the locking mechanism is unlocked by another different device or if the key does not include the correct code signal that matches the code signal from the electronic security system provided inside the vehicle, the electronic security system will turn on the alarm system and sound the audible alarm to alert the unusual situation.

The anti start system comprises a set of electric wires called a "wire socket." At one end the wire socket is connected to a micro switch. Another end of the wire socket is connected to an electric system of the vehicle for supplying electricity, preferably at a position under the steering wheel system of the vehicle. The micro switch is attached on a lateral side of an upper portion of the cover member's cover element of a gear lever locking device. The micro switch includes a switch pressing rod attached thereto and protruding through the opening on the lateral side of the cover element.

When the gear lever locking device is in the locked position, the first stud will be slid to push against the switch pressing rod. The switch pressing rod will slide to push a trigger on the micro switch. Once the micro switch's trigger is pressed, the electricity supplied to the micro switch will be cut off since an electrical circuit is not completed, thus preventing the vehicle's engine from being started.

The first stud is slid out of the locked position and away from the trigger of the micro switch when the gear lever locking device is moved to an unlocked position, thereby completing the electrical circuit of the micro switch. Electricity is then supplied to the anti-start system, thereby allowing the engine to start and the regular movement of the gear lever.

BRIEF DESCRIPTION OF THE SEVERAL
VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

Figure 1:
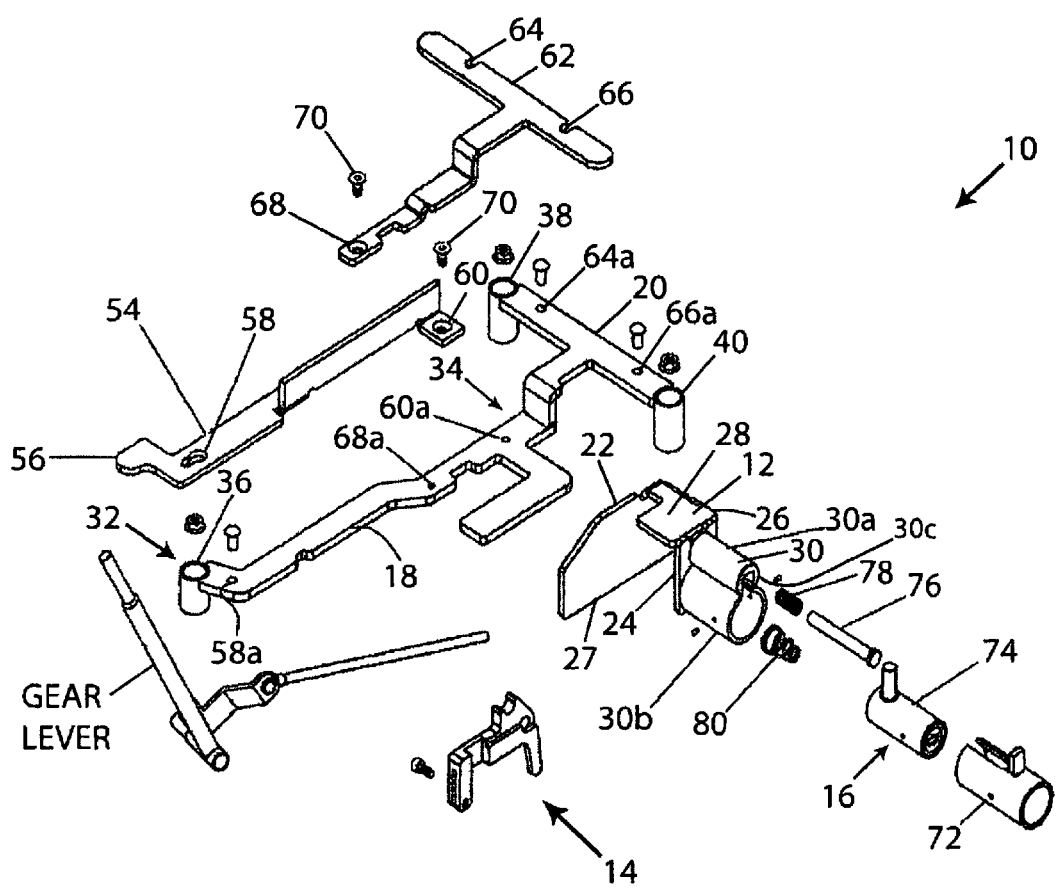
FIG. 1 is an exploded, perspective view of a gear lever locking device in accordance with a first preferred embodiment of the present invention.

In a first preferred embodiment, the present invention provides for a gear lever locking device 10, as shown in FIGS. 1-10. The gear lever locking device 10 includes a cover member 12, a connector 14, a locking mechanism 16, a first fixing leg 18, and a second fixing leg 20, as best shown in FIGS. 1 and 1A.

The cover member 12 is generally configured, as shown in FIG. 1, having an open box like configuration. The cover member 12 includes first and second lateral walls 22, 24 and a rear side wall 26. In addition, the cover member 12 includes a top wall 28 connected to the lateral side walls 22, 24 and the rear side wall 26. The first and second lateral walls 22, 24, and the rear side wall 26 collectively form a lower edge 27 that couples with the first fixing leg 18 and the second fixing leg 20

Figure 2:
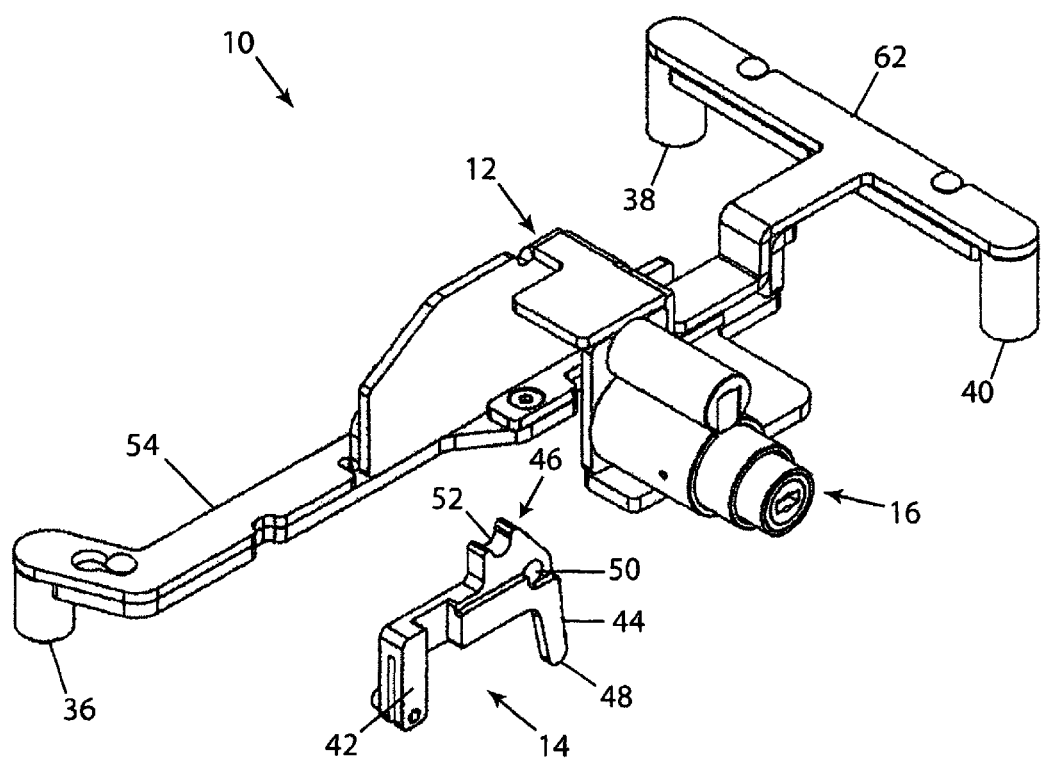
FIG. 2 is a perspective view of the gear lever locking device of FIG. 1.

(FIG. 2). A cover element 30 extends perpendicularly form the second lateral wall 24 for covering the locking mechanism 16, as further described below.

Figure 1A:
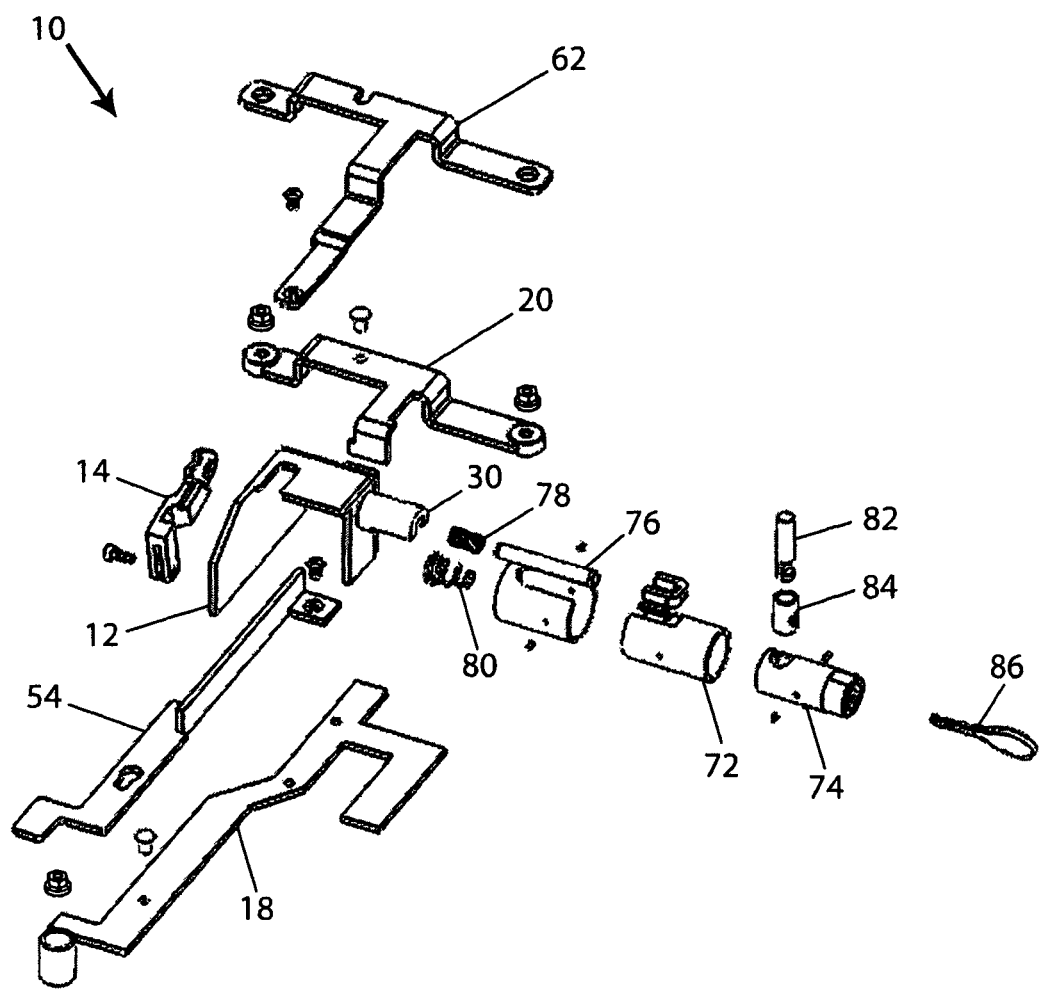
FIG. 1A is an exploded, perspective view of the gear lever locking device of FIG. 1.

The first fixing leg 18 is generally configured, as shown in FIGS. 1 and 1A. In general, the first fixing leg 18 is a substantially planar member having an overall configuration in the shape of the letter "J". The first fixing leg 18 includes a first end 32 and an opposite second end 34. The first end 32 includes a tubular mounting member 36. The tubular mounting member 36 is also positioned to correspond to a position of an original mounting screw (not shown) on a vehicle about its gear lever. The second end 34 is configured to attach to the second fixing leg 20, as shown in FIG. 1.

The second fixing leg 20 is generally configured, as shown in FIGS. 1 and 1A. In general the second fixing leg 20 is configured in the shape of the letter "T". The second fixing leg 20 includes a first tubular mounting member 38 and a second tubular mounting member 40 about opposite ends of the second fixing leg 20. The first and second tubular mounting members 38, 40 are positioned to correspond to the positions of original mounting screws (not shown) of the vehicle about its gear lever.

The first fixing leg and the second fixing leg 18, 20 attach to the cover member 12. The gear lever locking device 10 is attached to a vehicle about its gear lever owing to the position of the tubular mounting members 36, 38, 40 of the first and second fixing legs 18, 20. That is, the gear lever locking device 10 is attached to a vehicle's gear lever frame by screws mounted through the tubular mounting members 36, 38, 40 which are received within the original mounting screw locations already positioned within the vehicle's gear lever mounting frame (not shown).

The connector 14 is configured, as best shown in FIG. 2. The connector 14 includes a fixing end 42, a first end 44 and a second end 46. The fixing end 42 includes respective holes for attaching the connector 14 to a coupling part of the gear lever, a gear sling of the gear lever, or a gear sling connected to the gear lever. The first end 44 is located opposite the fixing end 42 and includes a pair of parallel flat protrusions 48. The second end 46 includes a hole 50 and a groove 52. The groove 52 is configured about an upper portion of the second end 46. The hole 50 is spaced apart from the groove 52 and positioned about a lower portion of the second end 46. The groove 52 and hole 50 are configured to receive a locking stud 76 (FIG. 1) of the locking mechanism 16, as further described below. That is, the groove 52 and hole 50 correspond to one of a locked position and an unlocked position of the gear lever locking device 10. When the connector 14 is connected to a gear lever, it is housed within the cover member 12.

The gear lever locking device 10 also includes a first screw guard 54 that is configured, as shown in FIG. 1. The first screw guard 54 has a shape that complements the shape of the first fixing leg 18. In particular, the first screw guard 54 includes a planar section 56 that covers the tubular mounting member 36 of the first fixing leg 18 when the first screw guard is fastened to the first fixing leg 18. The first screw guard 54 includes throughholes 58, 60 that correspond with respective throughholes 58a, 60a on the first fixing leg 18 for attaching the first screw guard 54 thereto using screws.

The gear lever locking device 10 also includes a second screw guard 62 generally configured, as best shown in FIG. 1. The second screw guard 62 is shaped to compliment the shape of the second fixing leg 20 and a part of the first fixing leg 18. The second screw guard 62 includes throughholes 64, 66, 68 for fastening the second screw guard 62 to the first and second fixing legs 18 and 20. The throughholes 64, 66, 68 correspond in position to corresponding throughholes 64a, 66a, 68a on the first and second fixing legs 18, 20 for attaching thereto by fasteners, such as screws 70. The second screw guard 62 includes ends that cover the first and second tubular mounting members 38, 40 of the second fixing leg 20.

When fully assembled to the gear lever assembly of the vehicle, screws 70 are blocked by the gear lever of the vehicle when the gear lever locking device 10 is in the locked position, thereby preventing access to the screws 70 by a person for purposes of disassembling the gear lever locking device 10 from the vehicle. However, when the gear lever locking device 10 is moved to the unlocked position, the screws 70 are accessible for removal if needed.

The locking mechanism 16 includes a locking mechanism housing 72, a turning mechanism 74, a locking stud 76 and a spring 78. The turning mechanism 74 is housed within the locking mechanism housing 72. The turning mechanism 74 and locking mechanism 72 assembly is positioned within a lower portion 30b of the cover element 30 with a return spring 80 positioned between the turning mechanism 74 and the second lateral wall 24 of the cover element 30. The spring 78 and locking stud 76 are also housed within an upper portion 30a of the cover member 12 when the turning mechanism 74 and locking mechanism housing 72 is assembled within the lower portion 30b of the cover member 12. The turning mechanism 74 includes a first stud 82 (FIG. 1A) arranged within a first stud sheath 84. In operation, the first stud 82 is actuatable by applying an external force such as manual pressing to the turning mechanism 74 for moving the locking stud 76 to its locked position (FIGS. 6, 8 and 10) within the locking mechanism 16 and when the locking stud 76 is received within one of the groove 52 and hole 50 of the connector 14. The locking stud 76 slides out of the groove 52 or hole 50 on the connector 14 when the first stud 82 inside the locking mechanism housing 72 is moved to the unlocked position. In the unlocked configuration (FIGS. 5, 7 and 9), the key 86 is used for unlocking, the return spring 80 biases the locking mechanism housing 72 out of its locked position. The first stud 82 functions to prevent the locking stud 76 from moving to the unlocked position.

The cover member 12 is also configured to receive the locking stud 76 about its lateral side. Specifically, the second lateral wall 24 is configured to receive the locking stud 76 to allow passage therethrough to the connector 14. The cover member's cover element 30 includes the upper portion 30a and the lower portion 30b. The upper portion 30a includes a spring mounting opening 30c within which the locking stud 76 is slideable therein.

Figure 4:
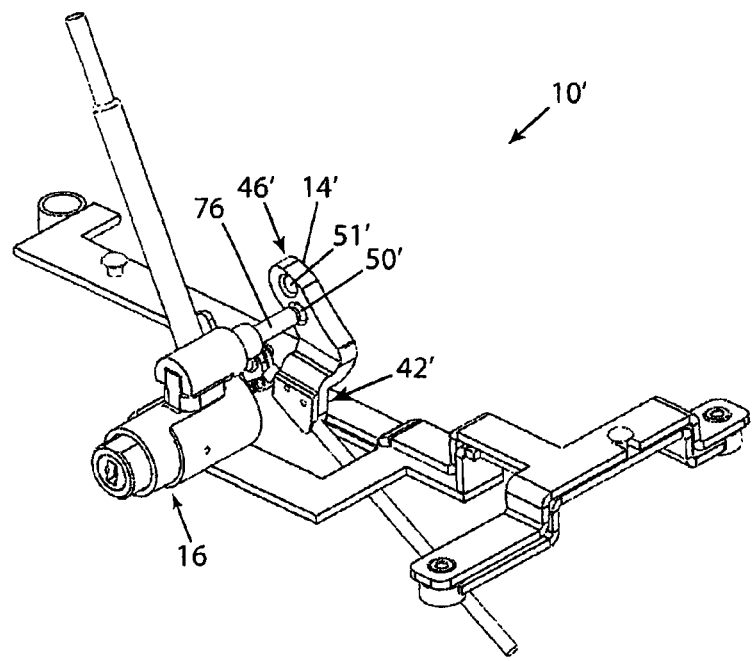
FIG. 4 is a top perspective view of an alternative embodiment of the gear locking device of FIG. 1.

FIG. 4 illustrates an alternative embodiment of the connector 14'. The connector 14' is configured, as best shown in FIG. 4, and includes a first end 42' connectable to a portion of a gear lever and a second end 46' that includes a first and a second hole 50' and 51' for receiving the locking stud 76 of the locking mechanism 16.

In sum, the gear lever locking device 10 is to be installed inside a gear lever cover panel of a vehicle. The gear lever locking device 10 is characterized in that it includes a cover member 12 that is snugly fitted to cover the locking mechanism 16 and the connector 14. The lower edge of the cover member 12 is coupled with the first fixing leg 18 and the second fixing leg 20. The first fixing leg 18 and the second fixing leg 20 are bent members with at least three protruding ends in the positions that correspond to the original mounting screws of the vehicle. The protruding ends of the first fixing leg 18 and the second fixing leg 20 include screw holes for mounting to the vehicle in the original position of the vehicle connected to the gear lever. On the first fixing leg 18 and the second fixing leg 20, there is provided the screw guards 54,

62. The screw guards 54, 62 are complementary in shape and closely cover the screws that fasten the first fixing leg 18 and the second fixing leg 20. The screw guards 54, 62 are fastened to the first fixing leg 18 and the second fixing leg 20 using e.g., screws 70. The process of fastening the screw guards 54, 62 to the first and second fixing leg 18, 20 is carried out while the gear lever locking device 10 is in the unlocked position. Subsequently, the screws 70 may be used in fastening the screw guards 54, 62 with the aid of mechanical tools. However, it is impossible to use the mechanical tools to fasten the screws 70 to the screw guards 54, 62 if the gear lever locking device 10 is in the locked position.

Figure 3:
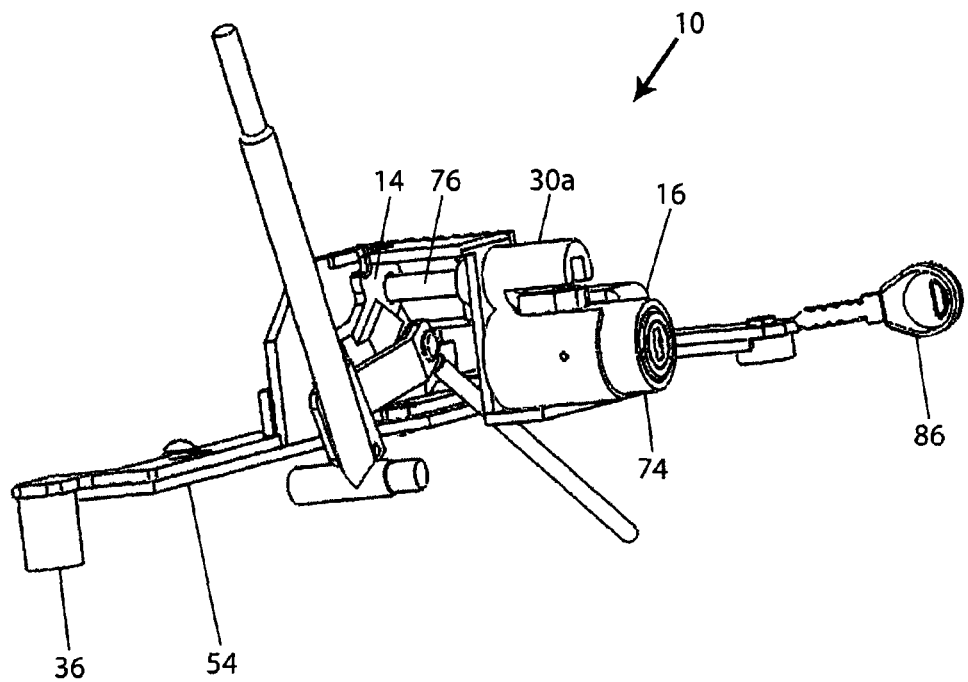
FIG. 3 is a perspective view of the gear lever locking device of FIG. 1 attached to a gear lever of a vehicle.

The aforementioned connector 14 is a cast metal member, one end of which includes a pair of parallel flat protrusions. The fixing ends thereof are provided with respective holes for use in fixing to the coupling part of the original gear lever, gear sling, or gear sling end connected to the original gear lever, as shown in FIG. 3. At least a part of the other end of the connector 14 is provided with a hole 50 or a concaved notch 52 or both for use in locking to the end of the locking stud 76 of the locking mechanism 14 to inhibit any movement of the gear lever.

The lateral portion of the cover member 12 is designed for the installation of the locking stud 76 and provided with a spring mounting opening 30*c* inside of which the locking stud 76 is slidable therein. The outer end of the locking stud 76 includes the first stud 82 of the turning mechanism 74 arranged inside the locking mechanism housing 72. The first stud 82 is actuated to push the locking stud 76 to be locked to the groove of the side of the cover member 12 designated for the mounting of the locking stud 76. There is provided the opening 30*c* which is configured to receive the spring 78 for mounting within the upper portion 30*a*. The spring 78 is slidable within the upper portion 30*a*.

The locking stud 76 engages the first stud 82 of the locking mechanism 16 arranged inside the locking mechanism housing 72. The first stud 82 is actuated to push the locking stud 76 to be locked to the groove 52 or the hole 50 on the connector 14 into the locked configuration. Either the groove 52 or the hole 50 is used depending upon the position of the gear lever itself, e.g., the gear levering being in a forwardly position (first gear) or a rearwardly position (second gear). The locking stud 76 slides out of the groove 52 or the hole 50 on the connector 14 while unlocking the first stud 82 inside the locking mechanism housing 72 to which the return spring 78 is mounted. The spring 78 pushes the body of the locking mechanism 16 out of its locked position. The outer end of the locking mechanism housing 72 is mounted to the locking mechanism 16 having the first stud 82 arranged inside the first stud sheath 84. The stud sheath 84 is actuated by the locking mechanism 16. The first stud 82 is locked to the locking mechanism housing 72 to prevent the retreating movement of the locking stud 76. Moreover, the locking mechanism 16 can include a key 86 used for locking and unlocking.

Figure 11:
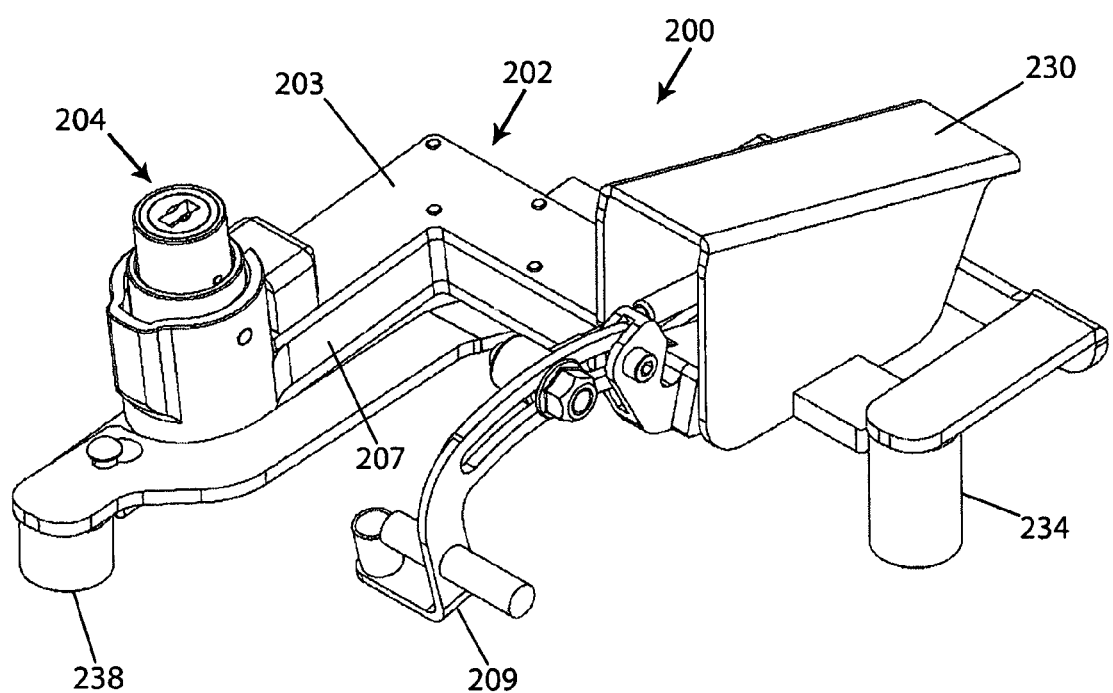
FIG. 11 is a perspective view of a gear lever locking device in accordance with a second preferred embodiment of the present invention.
Figure 12:
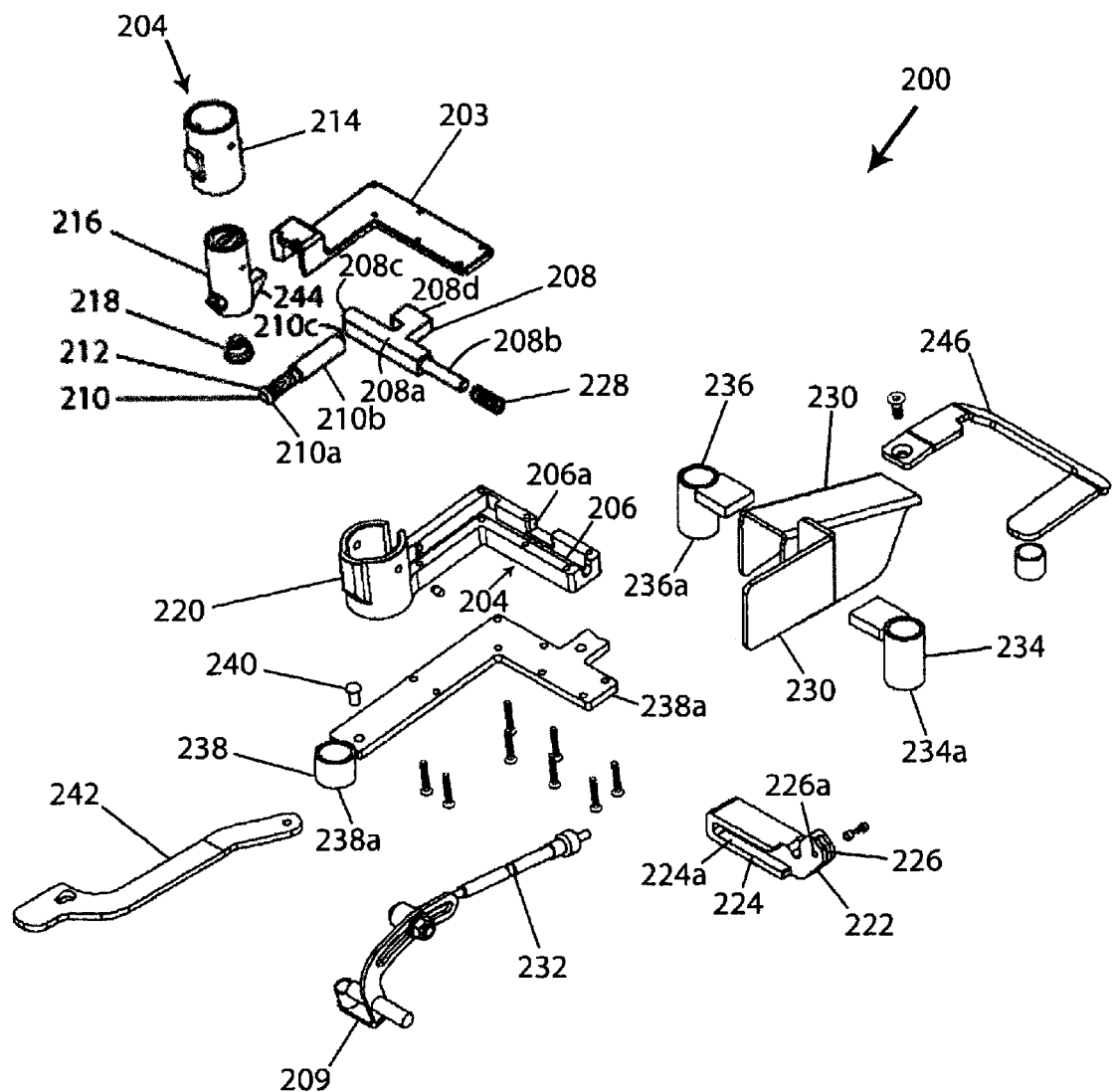
FIG. 12 is an exploded, perspective view of the gear locking device of FIG. 11.

In a second preferred embodiment, the present invention provides a gear lever locking device 200, as shown in FIGS. 11-15. The gear lever locking device 200 is installed inside a gear lever cover panel of a vehicle. The gear lever locking device 200 includes a stud chamber 202, a locking mechanism 204 and a sling retaining plate 209, as shown in FIG. 11. The stud chamber 202 is configured to have a shape in accordance with an inner space of the gear lever cover panel. Preferably, the stud chamber 202 is configured having a substantially L-shaped housing configuration. The stud chamber 202 includes an upper cover 203 that can be disassembled and a housing groove 206. The housing groove 206 includes a portion for the installation of a stud 208. The stud 208 is configured, as best shown in FIG. 12, having a main body portion 208*a* and a cylindrical extension 208*b* extending from the main body portion 208*a* about one end. About the opposite end, the main body portion 208*a* includes an inclined plane 208*c*. The inclined plane 208*c* is configured to engage a stud pushing mechanism 210. The stud 208 is generally configured to be received within the housing groove 206 about one leg of the L-shaped housing groove 206.

The gear lever locking device 200 also includes the stud pushing mechanism 210, as shown in FIG. 12. The stud pushing mechanism 210 is generally configured as a cylindrical stud having a first end 210*a* configured to receive a spring 212 that circumscribes the first end 210*a*. The stud pushing mechanism 210 has an opposite second end 210*b* having a larger diameter than the first end 210*a*. About the end of the second end 210*b* is a curved plane 210*c*, that is preferably configured to have a conical shape. The curved plane 210*c* engages the inclined plane 208*c* of the stud 208. The stud pushing mechanism 210 is arranged internally in a corresponding manner to the housing groove 206, about its other leg portion that is perpendicular to the leg portion in which the stud 208 is housed within.

The locking mechanism 204 includes a locking mechanism chamber 214, a turning mechanism 216 and a return spring 218. The locking mechanism chamber 214 is configured to receive the turning mechanism 216 therein. The locking mechanism chamber 214 with the turning mechanism 216 is then assembled within a locking mechanism housing 220 that is connected to the stud chamber 202. In the locking mechanism housing 220 is the return spring 218 positioned to bias the turning mechanism 216.

Figure 13:
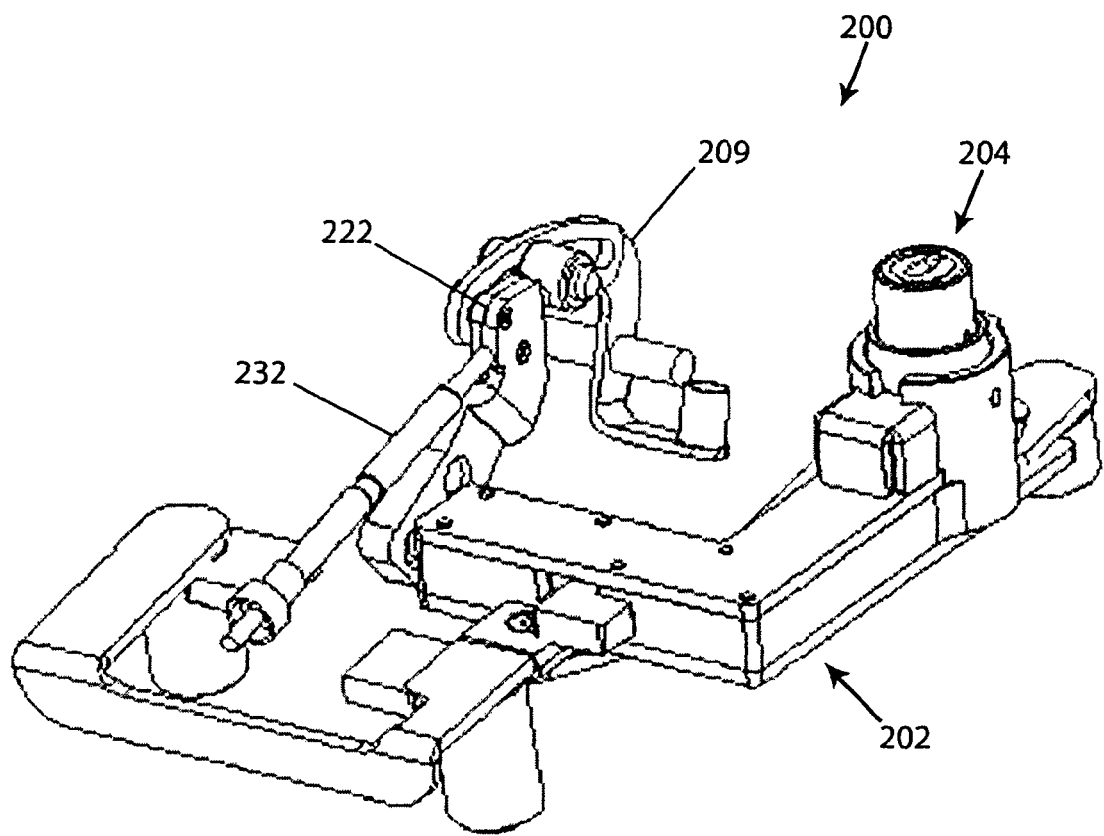
FIG. 13 is a partially exposed perspective view of the gear lever locking device of FIG. 11.
Figure 14:
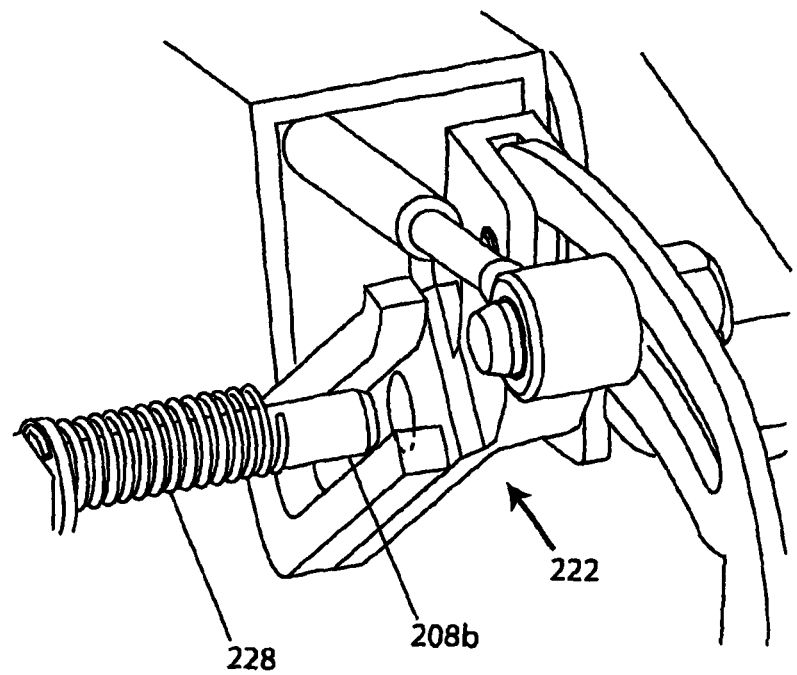
FIG. 14 is an enlarged, perspective view of a portion of the gear lever locking device of FIG. 11 in an unlocked position.
Figure 15:
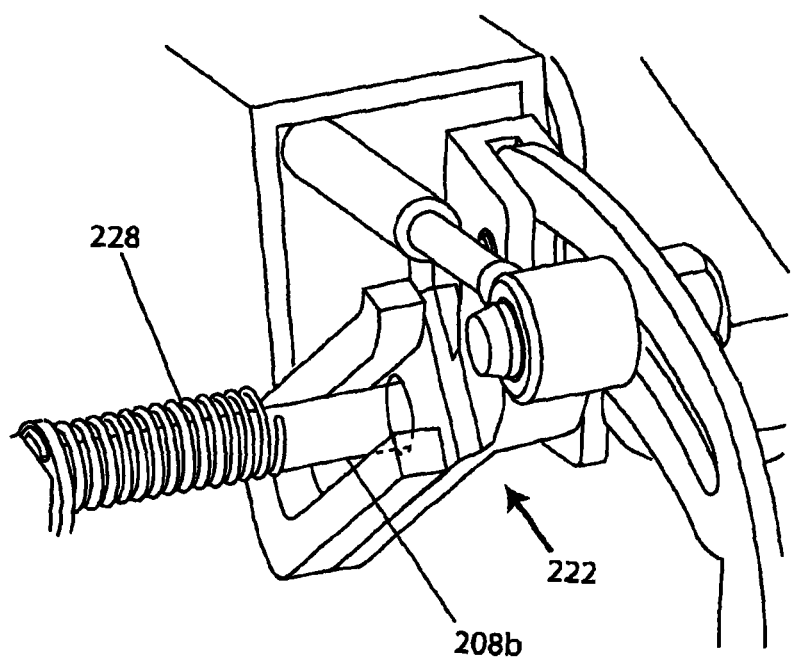
FIG. 15 is an enlarged, perspective view of a portion of the gear lever locking device of FIG. 11 in a locked position.

Connected to an opposite end of the stud chamber 202, to which the locking mechanism housing 220 is connected, is connected the sling retaining plate 209. In particular, the sling retaining plate 209 is connected to the stud chamber 202 through an auxiliary connector 222. The auxiliary connector 222 is configured, as best shown in FIG. 12, and includes a sustaining groove 224 and a curved extension 226. The curved extension 226 includes a through hole 226*a* for receiving a fastener to fasten the sling retaining plate 209 thereto (FIG. 12). The sustaining groove 224 of the auxiliary connector 222 is attached to the stud chamber 202 as shown in FIG. 13. Specifically, the opening of the groove 224*a* is oriented in facing engagement with the stud 208 assembled within the housing groove 206. Thus, in operation, the stud 208 is insertable through the groove opening 224*a* of the auxiliary connector 222 at an end of the stud chamber 202. When the stud 208 extends through to the groove opening 224*a* of the auxiliary connector 222, the gear lever locking device 200 is in the locked position (FIG. 15) to lock the movement of the sling retaining plate 209. The sling retaining plate 209 assembles to a gear lever of the vehicle, such as an automobile. In the unlocked position (FIG. 14), the stud 208 withdraws from the auxiliary connector 222 and slides back into the stud chamber 202. A return spring 228 circumscribes the cylindrical extension 208*b* of the stud 208 to bias the stud 208 to the unlocked position within the stud chamber 202.

The gear lever locking device 200 further includes a cover wall member 230, configured as best shown in FIG. 12. The cover wall member 230 covers the auxiliary connector 222 and is connected to a lateral side of the stud chamber 202. The cover wall member 230 also covers a portion of the sling retaining plate 209 and the sling end connector 232. The gear lever locking device 200 also includes a means to connect to the gear lever housing frame of the vehicle by a number of fixing legs 234, 236, 238, along with fixing legs fastening screws e.g., 240. The fixing legs 234, 236, 238 are assembled to the gear lever locking device 200, as shown in FIGS. 11 and 12. The fixing legs 234, 236, 238, each include a cylindrical pipe positioned at a location of an existing screw of the gear lever housing frame for attaching directly thereto.

The auxiliary connector 222 is a plate provided with the groove opening 224a, that is a through hole for receiving, via insertion, the stud 208 and in particular the cylindrical extension 208b of the stud 208. The auxiliary connector 222 is locked in position by the stud 208 in such a manner that the end of the auxiliary connector 222 does not abut a floor of the vehicle or a vehicle mechanism. The auxiliary connector 222 also includes a portion that serves as a mounting portion to be fixed to a groove end of the sling end retaining plate 209, i.e., the curved extension 226.

The stud 208 also includes an auxiliary extension 208d that extends from a lateral side of the stud 208. The auxiliary extension 208d extends through an opening 206a on a lateral side of the stud chamber 202 to obscure the screws fastening the screw guard 242 that covers the fixing leg 238, in order to prevent the removal of the fixing legs 234, 236, 238 when the gear lever locking device 200 is in the locked position.

The locking mechanism 204 is installed inside the locking mechanism housing 220 mounted at the end of the stud chamber 202, about the end where the stud pushing mechanism 210 is located. The turning mechanism 216 of the locking mechanism 204 includes a pin 244 that is moved upwardly when the turning mechanism 216 is moved to the locked configuration. The pin 244, when moved upwardly, moves the stud pushing mechanism 210 to engage the stud 208.

The fixing legs 234, 236, 238, each include a cylindrical pipe 234a, 236a, 238a for covering screw heads that attach the fixing legs 234, 236, 238 to the vehicle at a position that corresponds to the fixing leg retaining screw holes. The cylindrical pipes 234a, 236a, 238a also include a lateral opening (not shown) for receiving a part of a protrusion.

In sum, the gear lever locking device 200 is to be installed inside the gear lever cover panel. The gear lever locking device 200 includes a stud chamber 202 having an upper cover 203 that is connected to the locking mechanism 204. The stud chamber 202 is shaped in accordance with the inner space of the gear lever covering panel. The lower part of the stud chamber 202 is detachably attached to a fixing base 238a. Within the inner space of the stud chamber 202 is the stud mounting portion and the stud pushing mechanism 210 arranged internally in a correspondent manner. The stud 208 is inserted through a through hole at the end of the stud chamber 202 to be locked with the auxiliary connector 222 and slides back by the force exerted from the return spring 228 and 212 mounted on the stud 208 and the stud pushing mechanism 210, respectively.

One part on the lateral side of the stud 208 includes an auxiliary extension 208d protruding through the opening 206a on the lateral side of the stud chamber 202 to slide to obscure the screws fastening the screw guard 246. This prevents the removal of the fixing legs 234, 236, 238 of the gear lever locking device 200 when the latter is in the locked position. The end adjacent to the stud 208 connected with the cover wall member 230 cast to cover the portion of the sling end connector 232 and the sling retaining plate 209. In addition, the lower part of the gear lever locking device 200 comprises a number of fixing legs along with the fastening screws. The screw holes on the upper fixing legs have an upwardly extending pipe covering the screw head and handling the closing insertion of the cylindrical pipe e.g., 234a at the lower end of the screw guard in the position that corresponds to the leg retaining screw hole.

The locking mechanism 204 or the turning mechanism 216 is installed inside the locking mechanism chamber/housing 220 with fastening means mounted in the locking mechanism chamber 220 and connected with the end of the side of the stud chamber 202 where the stud pushing mechanism 210 is located. The lock pressing mechanism includes a pin/pin end 244 for use in moving the end of the stud pushing mechanism 210 and the lower part of the locking mechanism chamber 214 still has a return spring 218.

The auxiliary connector 222 is a plate provided with at least one opening 224a for the insertion of the stud end 208b to block in the locked position at the P or N position of the transmission. A portion on one end is used as the mounting portion to be fixed to the groove end of the conventional rotatable sling end retaining plate 209. There is a groove 224 at the lateral side of the auxiliary connector 222 at the side connected to the stud 208 for use in receiving the stud end 208b in such a manner that the end of the auxiliary connector 222 does not abut the vehicle floor or the vehicle mechanism.

Alternatively, auxiliary connector 222 is a plate provided with at least one hole for the insertion of the stud end 208b to block in the locked position. A portion on one end is used as the fixing portion with the gear sling end 232 connected to the gear lever. Further, one portion on the screw guard 242 comprises the openings for use in engaging with the stud head 240 fastened at the upper part of the fixing leg in the correspondent positions as a mechanism in fastening the screw guard 242.

The end of the stud pushing mechanism 210 at which part is connected to the mechanical pin 244 of the lock pressing mechanism 216 is the inclined or curved plane used in abutting the inclined plane of the mechanical pin 210c of the lock pressing mechanism 216 to move the end of the stud pushing mechanism 210. In addition, on the stud pushing mechanism 210, there is provided a spring groove 210a inside of which is installed the return spring 212 to help in pushing the stud pushing mechanism 210 backward when the gear lever locking device 200 is unlocked.

Figure 16:
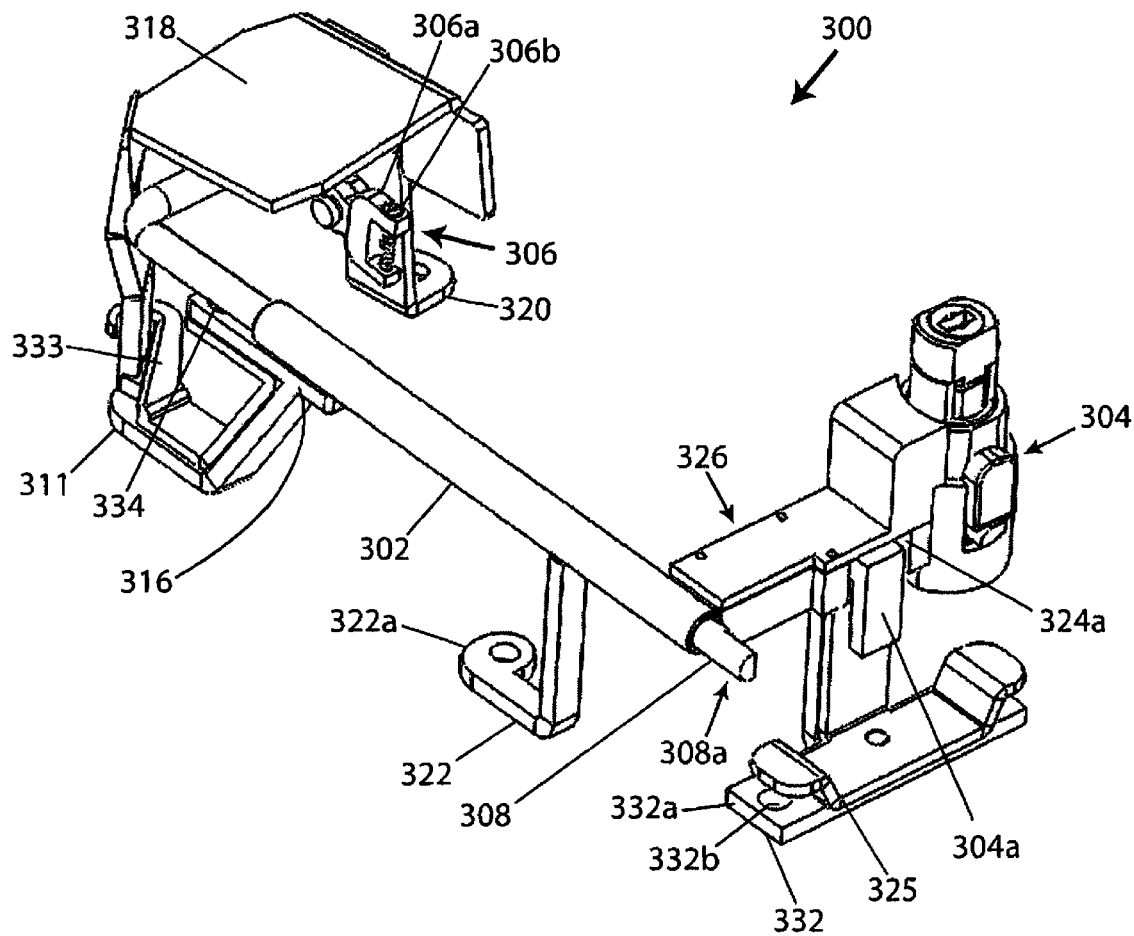
FIG. 16 is a perspective view of a gear lever locking device in accordance with a third preferred embodiment of the present invention.
Figure 17:
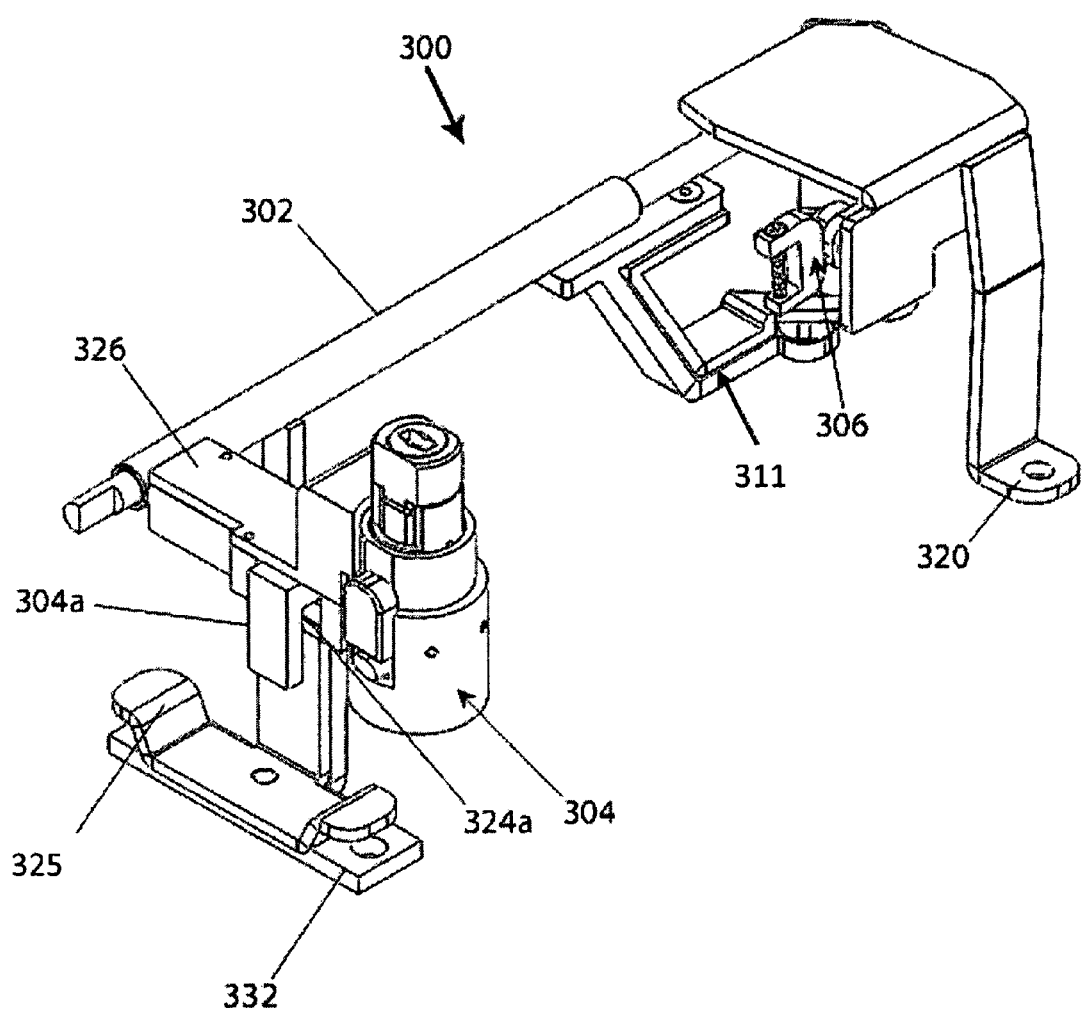
FIG. 17 is a rear perspective view of the gear lever locking device of FIG. 16.
Figure 18:
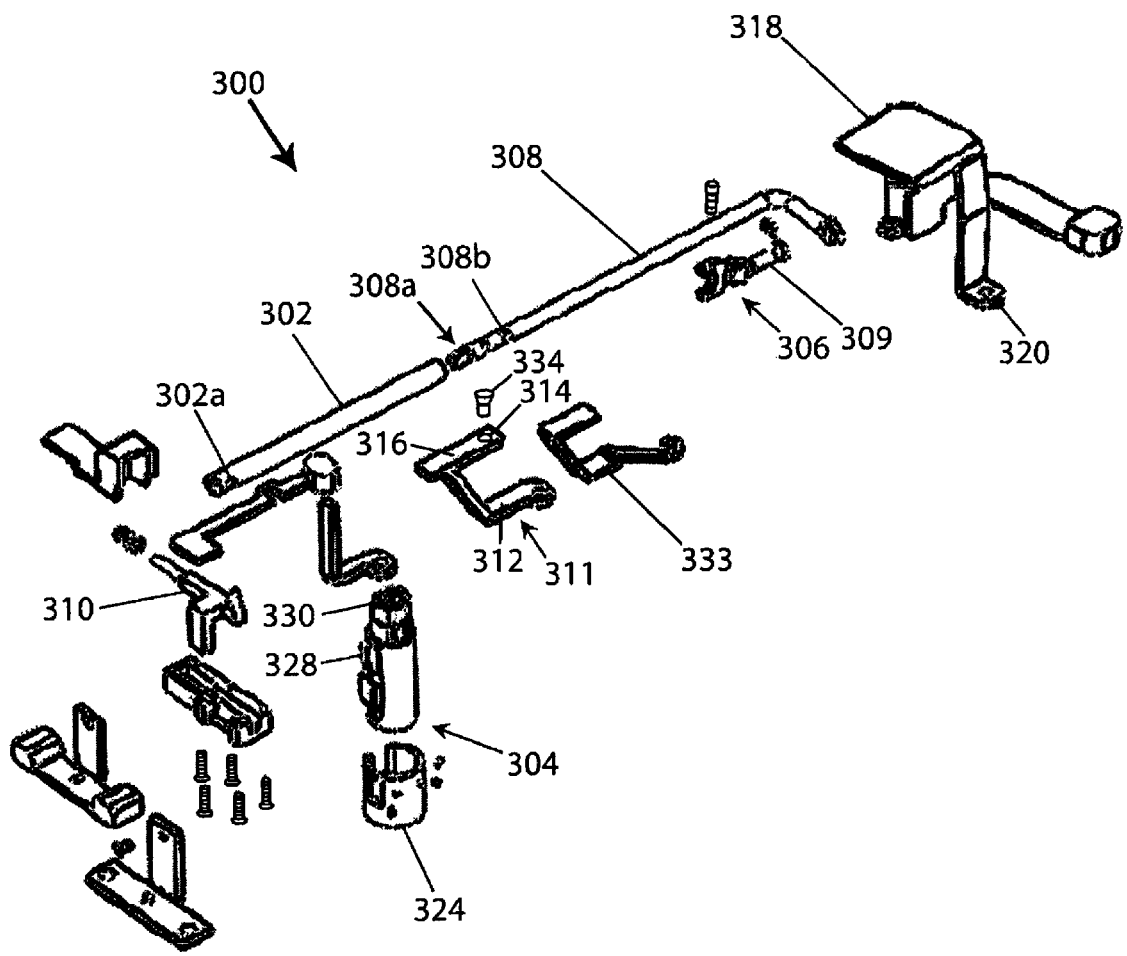
FIG. 18 is an exploded perspective view of the gear lever locking device of FIG. 16.

In a third preferred embodiment, the present invention provides a gear locking device 300, as shown in FIGS. 16-21. The gear locking device 300 includes an axle pipe 302, a locking mechanism unit 304 and an engagement member 306. The axle pipe 302 houses a sliding axle 308 that is mounted within the axle pipe 302. The axle pipe 302 is configured as a tubular member. The sliding axle 308 is configured as an L-shaped rod member having a plurality of cutouts about its first end 308a. The second end 308c of the sliding axle 308 or its front end is curvedly bent, as shown in FIG. 18. The sliding axle 308 also includes a tip about the second end 308c of the smaller length segment that is connected to the engagement member 306. That is, the engagement member 306 is connected to the front end of the sliding axle 308. The engagement member 306 is configured as best shown in FIG. 16 to engage with a gear lever sling end retaining plate, or a gear lever sling of a vehicle.

The sliding axle 308 also includes recesses or cutouts 308b (FIG. 18) about its rear end or first end 308a. The recesses 308b are positioned along the sliding axle 308, so as to correspond to a P position or an N position of a gear lever of the vehicle. The recesses 308b support or engage with a locking stud 310 of the locking mechanism unit 304. The locking stud 310 extends through a through hole 302a on the axle pipe 302.

A lower front part of the axle pipe 302 includes a fixing leg 311 with a flange 312 and a cast bent screw hole extending downwardly so as to be engaged with an original screw of the vehicle. About a rear end of the flange 312 of the fixing leg 311, there is provided an extension member extending upwardly to be engaged with a portion of the axle pipe 302. The flange 312 is also coupled to a lower part of an upper cover 318 that covers a portion above the front end of the sliding axle 308 to prevent the destruction thereof. The upper cover 318 is configured, as best shown in FIGS. 16-18. The upper cover 318 also includes a fixing leg 320 that extends downwardly. About the lower part of the rear end of the axle pipe 302 is attached a fixing leg 322 having a flange 322a (FIG. 16) facing downwardly.

Attached to a lateral portion of the axle pipe 302 is the locking mechanism unit 304. The locking mechanism unit 304 is received within a fastening stud chamber 324 that is connected to a lateral side of the axle pipe 302 on an opposite side of a stud chamber 326. The stud chamber 326 includes the locking stud 310 that is housed therein.

A turning mechanism 330 is received and assembled within the locking mechanism unit 304 and includes an end pushing stud 328 that engages the locking stud 310 when the locking mechanism unit 304 is pressed or the turning mechanism 330 is turned by a key.

About the lateral side of the stud chamber 326, is connected a fixing leg 332 that extends downwardly from the stud chamber 326. Each end of the fixing leg 332 has a flange 332a with a screw hole 332b. A screw guard 325 is provided on each flange 322a of the fixing leg 332. Each screw guard 325 has its end bent into a shape that completely covers the screw heads of the screws used in fastening the fixing leg 332 to the vehicle. A portion of the screw guard 325 is bent to be adjoined to the fixing leg 332 and is connected thereto by a fastening means.

The locking mechanism unit 304 also includes an extension member 304a (FIG. 16) that extends through a lateral opening 324a of the fastening stud chamber 326. The extension member 304a is used to slide over and cover the screw that fastens the screw guard 325 so as to prevent the removal of the fixing leg 322 of the gear lever locking device 300 when in the locked position.

The fixing leg 311 also includes a screw guard 333 used in preventing the removal of a fixing leg fastening screw 334. The fixing leg 311 is connected to the gear lever housing frame by the screw 334 in a position substantially beneath the sliding axle 308 when the gear lever locking device 300 is in the locked position. That is, the front portion of the sliding axle 308 slides into a position that covers the screw 334 (FIG. 16) when the sliding axle 308 corresponds to a position of the key or end gear of the vehicle.

The turning mechanism 330 or the lock pressing mechanism is installed inside the locking mechanism chamber 324, which is connected to the stud chamber 326. The stud chamber 326 includes the end pushing stud or the stud pushing mechanism 328. The turning mechanism 330 also includes a driving pin (not shown) that is used in pushing the end of the pushing stud mechanism 328. The turning mechanism 330 is also configured to receive a key for use in turning the locking mechanism unit 304 for use in locking or unlocking the gear lever locking device 300 to the locking or unlocking position, respectively.

The engagement member 306, as best shown in FIGS. 16 and 17, is configured to have a U-shaped configuration. The U-shaped member 306a has an aperture extending through the parallel sides of the U-shaped member for receiving a fastener 306b. The engagement member 306 receives a gear lever or a gear lever sling of the vehicle. As shown in FIG. 18, the engagement member 306 also includes a hinge member 309 for pivotably connecting the engagement member 306 with the sliding axle 308 about its front end.

Figure 19:
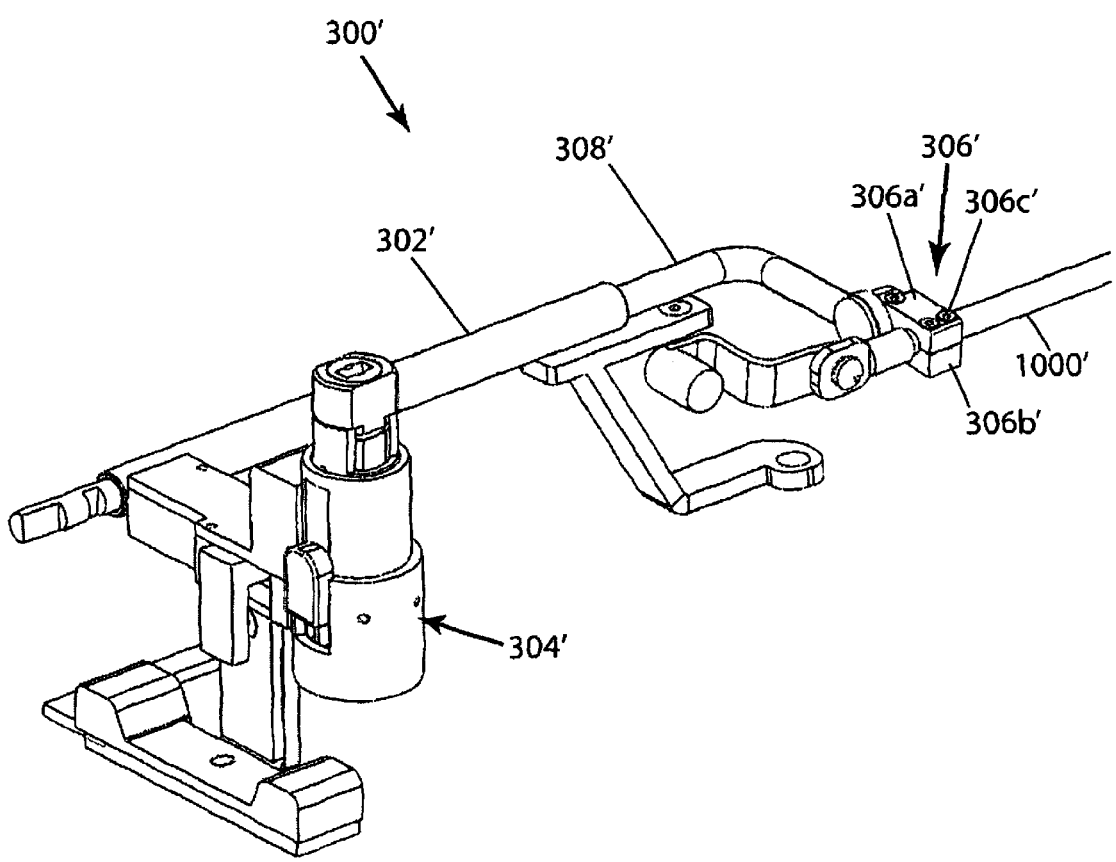
FIG. 19 is a perspective view of another embodiment of the gear lever locking device of FIG. 16 attached to a gear sling of a vehicle.
Figure 20:
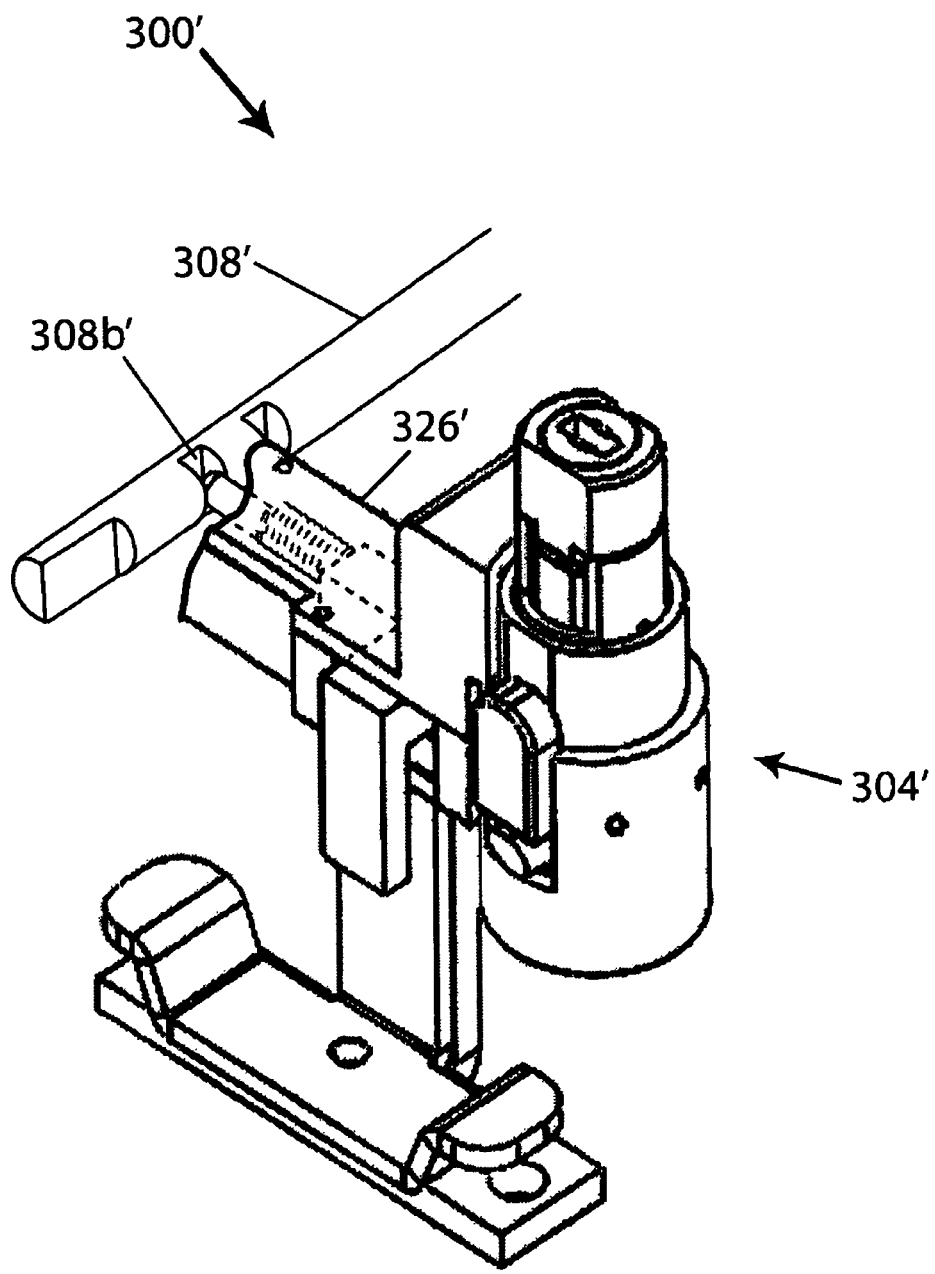
FIG. 20 is an enlarged, rear perspective view of a portion of the gear lever locking device of FIG. 19.
Figure 21:
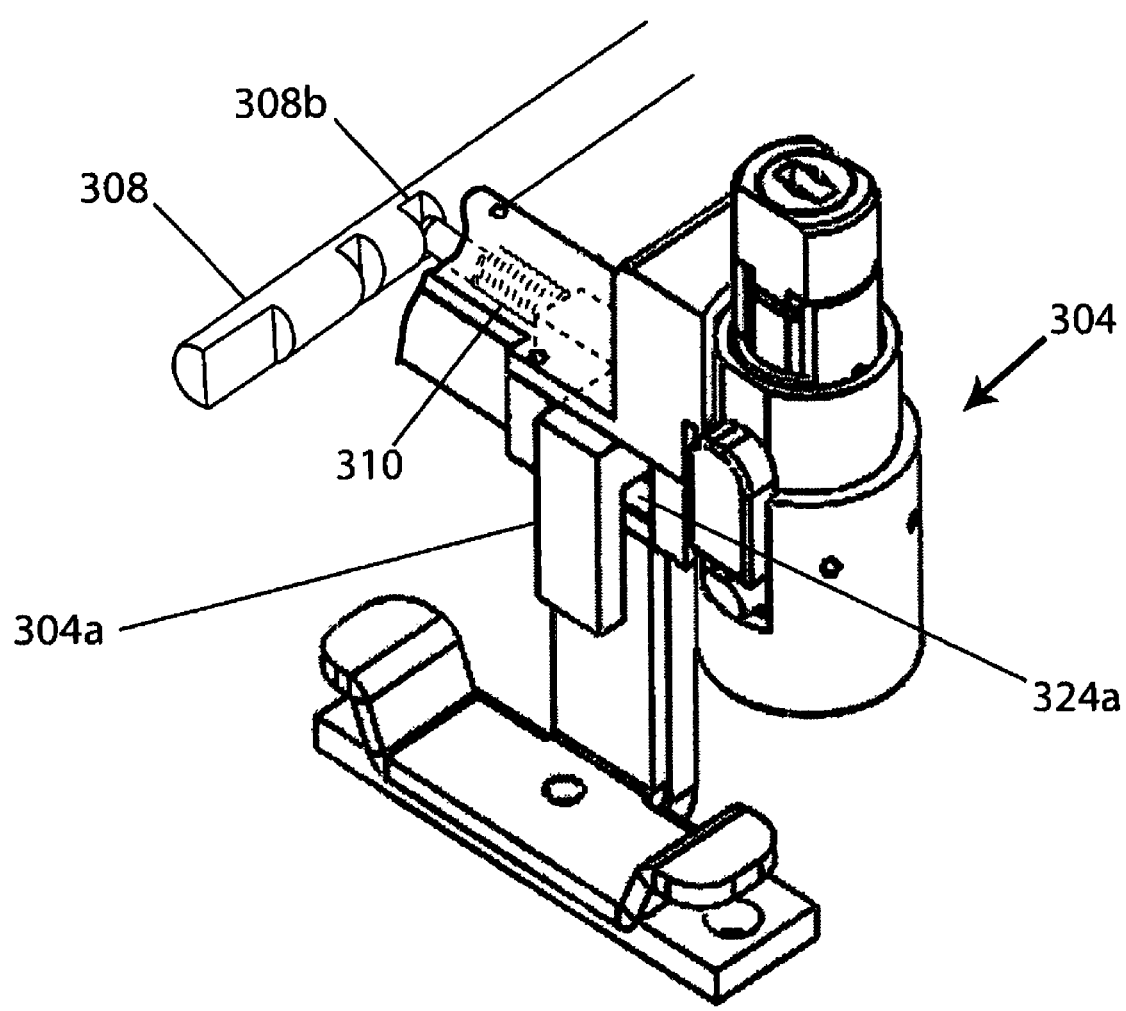
FIG. 21 is an enlarged, perspective view of a portion of the gear lever locking device of FIG. 19 in a locked position.

FIGS. 19 and 20 illustrate an alternative embodiment of the present invention. The gear lever locking device 300' in this embodiment, is substantially the same as the gear lever locking device 300 as described above, except for the configuration of the engagement member 306'. The engagement member 306' is configured, as shown, for receiving and fastening to a gear lever sling 1000' of the vehicle. The engagement member 306' includes a pair of parallel plates 306a', 306b' having an aperture formed therethrough for receiving the gear lever sling 1000'. The parallel plates 306a', 306b' are fastened together by e.g., screws 306c'.

In sum, the gear lever locking device 300 is to be installed inside the gear lever cover panel of a vehicle. The gear lever locking device 300 includes an axle pipe 302 that is mounted to the sliding axle 308. The second end 308c of the sliding axle 308 is curvedly bend or "L"shaped, while its tip is provided with the engagement member 306. The engagement member 306 is to be engaged/connected to the gear lever sling end retaining plate or engaged with the gear lever sling end of a vehicle, as shown e.g., in FIG. 18. The first end 308a of the sliding axle 308 is provided with holes or slots in a position i.e., a sliding position, to that of a park "P" position or the neutral "N" position to support or engage the locking stud end 310 of the locking mechanism unit 304 extending through the through hole 302a on the axle pipe 302.

The lower front part of the axle pipe 302 is provided with the fixing leg 311 having the flange 312 and the cast bent screw hole 314 extending downwardly to be engaged with the original screw of the vehicle. At the rear end of the flange 312 of the fixing leg 311, there is provided an extension member 316 extending upwardly to be engaged with a portion of the axle pipe 302. The flange 312 is also coupled to the lower part of the upper cover 318 that covers the portion above the front end of the sliding axle 308 to prevent the destruction or tampering thereof. At the other part of the upper cover plate 318, there is the fixing leg 320 extending downwardly therefrom.

At the lower part of the rear end of the axle pipe 302, there is the fixing leg 322 having a flange 322a facing downwardly. In addition, the lateral portion of the rear end of the axle pipe 302 comprises the locking mechanism unit 304 of which a lateral part of the fastening stud chamber 324 is connected to the lateral side of the axle pipe 302 on the opposite side of the stud chamber 326. The turning mechanism 330 with the end pushing stud 328 of the locking stud is used in pushing the lock mechanism 304 when the lock mechanism 304 is pressed or the turning mechanism 330 is turned by the key.

At the lateral side of the stud axle or stud chamber 326, there is the fixing leg 332 extending downwardly. The fixing leg 332 has a flange 332a along with the screw hole 332b. A screw guard 325 is provided on the flange 332a of the fixing leg 332. Each of the ends of the screw guard 325 is bent into the shape that completely covers the screw head used in connecting the fixing leg 332 to the vehicle's gear lever housing frame. One end of the screw guard 324 is bent to be adjoined to the fixing leg 332. The screw guard 325 and the fixing leg 332 are connected by fastening means, such as screws, studs, etc. One portion on the lateral side of the locking mechanism unit 304 is provided with the extension member 304a extending through the lateral opening 324a. The extension member 304a is operated to cover the screw fastening the fixing leg 332 to the vehicle in order to prevent the removal of the fixing leg fastening screws of the gear lever locking device 300 while in the locked position.

In addition, the fixing leg 311 comprises the screw guard 333 used in preventing the removal of the fixing leg fastening screws and connecting to the fixing leg 311 by means of the fastening screws. The screw guard 333 is functional in the position that the front portion of the end of the sliding axle 308 slides into the position that covers the screws when the sliding axle 308 is in the corresponding position as the P gear or N gear, while the gear lever locking device 300 is in the locked position.

The turning mechanism 330 or the lock pressing mechanism is installed inside the locking mechanism chamber 324 that is connected with the stud chamber 326 having the stud pushing mechanism 310. The turning mechanism 330 comprises a driving pin end used in pushing the end of the stud pushing mechanism 310. Alternatively, the turning mechanism 330 includes a key for use in turning to lock or unlock the gear lever locking device 300 into the locking or unlocking position, respectively.

In accordance with a fourth preferred embodiment, the present invention provides a gear lever locking device 400, as shown in FIGS. 22-27. The gear lever locking device 400 includes a sliding axle chamber 402, a sliding axle 404, a locking mechanism unit 406, a gear lever transverse member 408, a first seat unit 410 and a second seat unit 412.

Figure 22:
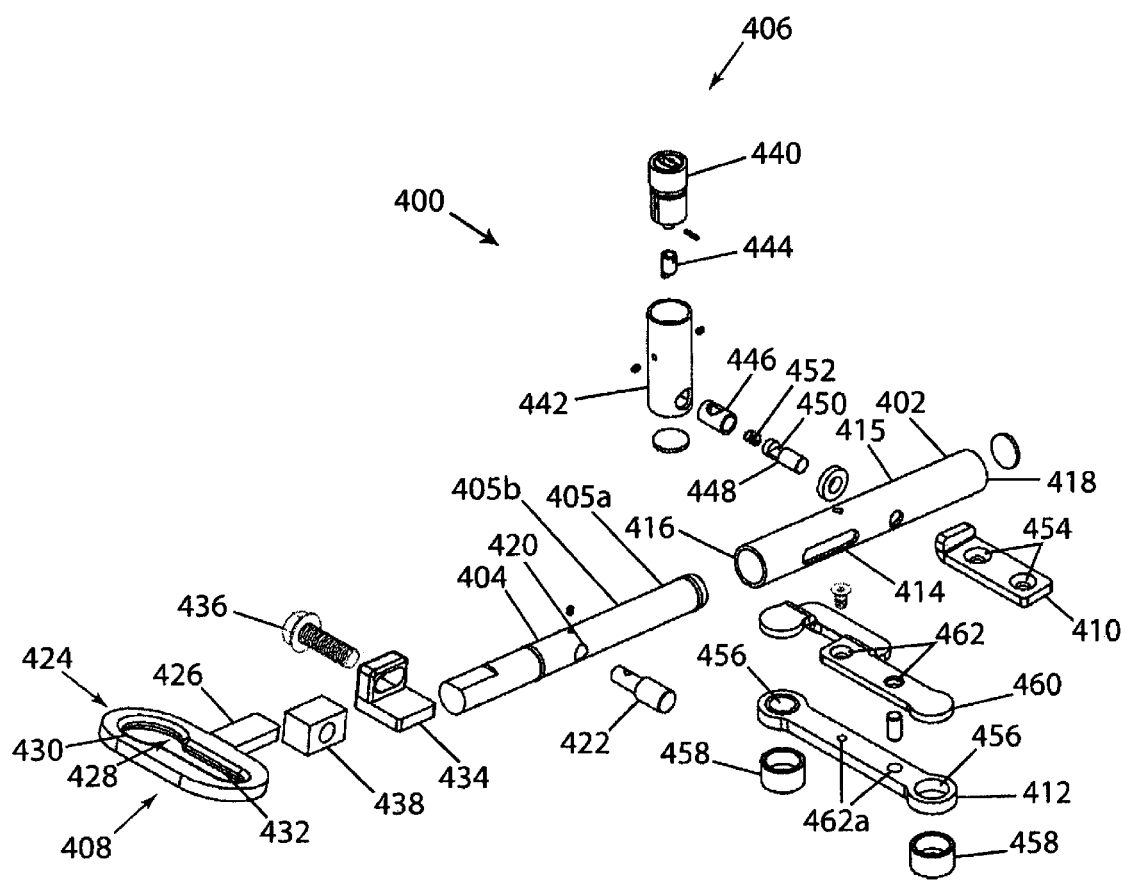
FIG. 22 is an exploded, perspective view of a gear lever locking device in accordance with a fourth preferred embodiment of the present invention.
Figure 33:
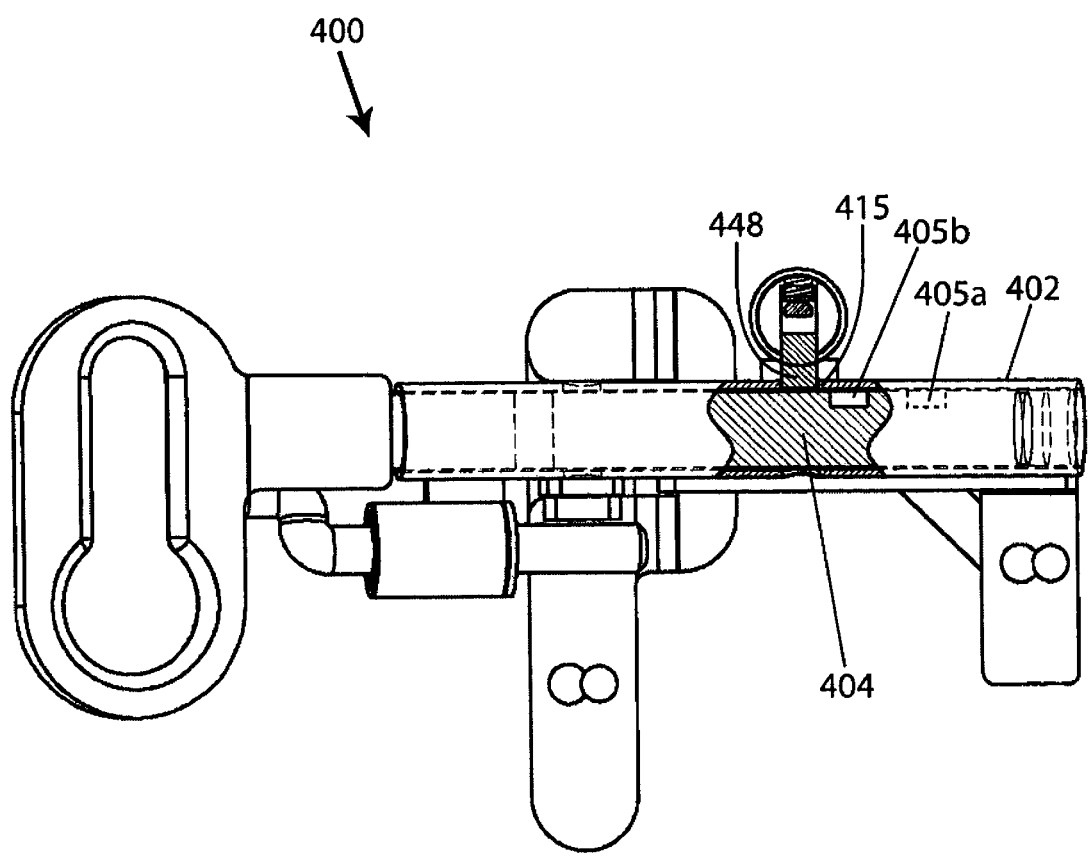
FIG. 33 is a partial cross-sectional top plan view of the gear lever locking device of FIG. 22.
Figure 34:
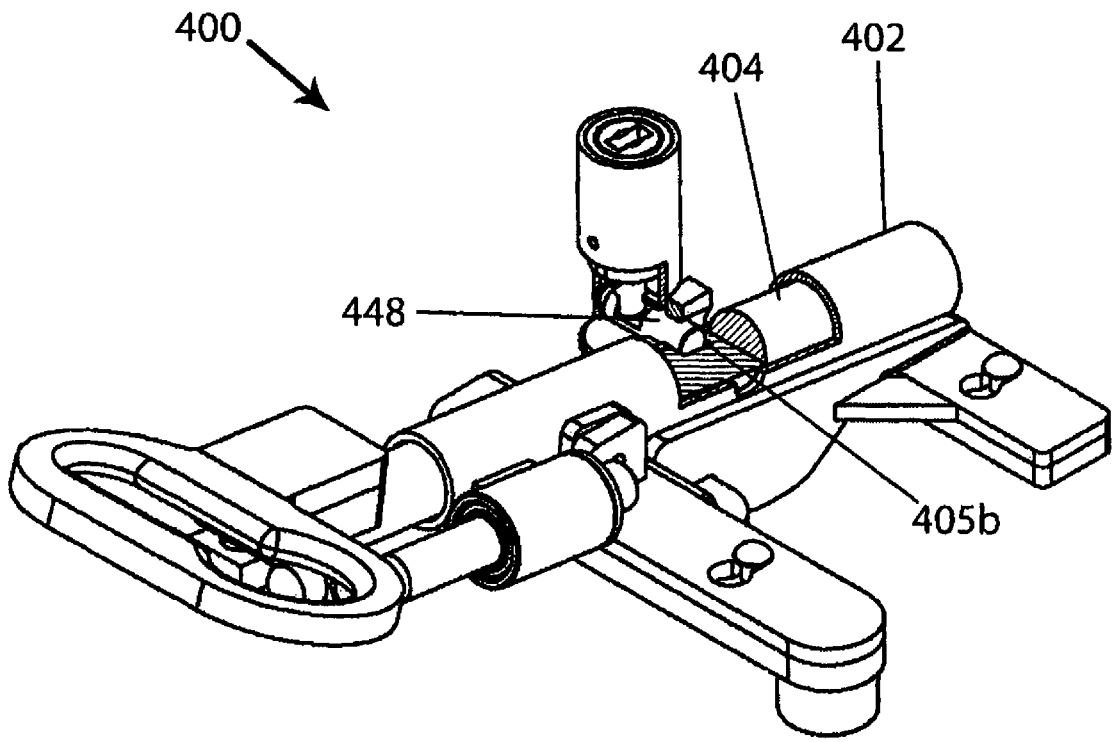
FIG. 34 is a perspective view of the gear lever locking device of FIG. 34.

The sliding axle chamber 402 is generally configured as a tubular member, as shown in FIG. 22. The sliding axle chamber 402 includes an opening 414 about a lateral side. The opening 414 is positioned to correspond to a position of an axle 422 extending transversely from the sliding axle 404, as further described below. The sliding axle chamber 402 further includes a stud hole 415, as shown in FIG. 33, for engaging with locking stud 448, as further described below. The sliding axle chamber 402 has an open end 416 and a closed end 418. The sliding axle chamber 402 is configured to slidably receive the sliding axle 404 through its open end 416.

The sliding axle 404 is generally configured as a rod, as shown in FIG. 22. The sliding axle 404 includes a stud hole 420 that receives the axle 422 that extends transversely or perpendicularly from a longitudinal axis of the sliding axle 404. The stud hole 420 is positioned about a mid portion of the sliding axle 404. The axle 422 is a relatively short axle configured as a rod that extends transversely from the sliding axle 404 and configured to extend through the opening 414 of the sliding axle chamber 402 when fully assembled. The front end of the sliding axle 404 is connected to the gear lever transverse member 408. The sliding axle 404 further includes two stud holes 405a and 405b on the lateral side opposite to the stud hole 420 for receiving locking stud 448 that extends transversely from the stud hole 405a or 405b of the sliding axle 404 and configured to extend through the stud hole 415 of the sliding axle chamber 402.

The gear lever transverse member 408 is generally configured, as shown in FIG. 22 and includes a loop member 424 and an extension member 426 that extends from a mid portion of the loop member 424. The loop member 424 has a generally oblong profile and includes a transverse aperture 428 that extends through the loop member 424. The transverse aperture 428 has one side configured as a circular opening 430 and an opposite end configured as a lateral slot 432. The circular opening 430 is in communication with the lateral slot 432. In general, the transverse aperture 428 of the gear lever transverse member 408 is configured for receiving a gear lever (not shown) of a vehicle. About a rear mid portion of the loop member 424 is the extension member 426 extending in a rearward direction. The gear lever transverse member 408 also includes a connector 434 for connecting the extension member 426 to the front end of the sliding axle 404. The connector 434 is generally configured to have an "L" shape configuration with its side end having an aperture configured to receive a screw 436. The gear lever transverse member 408 can optionally include a member 438 to facilitate the connection between the extension member 426 and the front end of the sliding axle 404 via the connector 434.

The locking mechanism unit 406, is shown in FIGS. 22-27, 33 and 34. The locking mechanism unit 406 is attached to a lateral side of the sliding axle chamber 402 for driving a locking stud 448 to be locked with a stud hole 415 of the sliding axle chamber 402 and extend through the stud hole 405a of the sliding axle 404 when the gear lever locking device 400 is in a locked position at P gear and extend through the stud hole 405b when the gear lever locking device is in a locked position at N gear. The locking mechanism unit 406 includes a turning mechanism 440 turnable by a key and housed within a locking mechanism chamber 442. The turning mechanism 440 is turnable inside the locking mechanism chamber 442 for example by a key inserted within the turning mechanism 440. The turning mechanism 440 includes a turning axle 444 that extends from a distal end of the turning mechanism 440 to the locking stud 448. The locking stud 448 is provided inside a stud body 446 that is housed within the locking mechanism chamber 442. The turning axle 444 extends to engage the locking stud 448 about a groove 450 on one end of the locking stud 448. When the locking stud 448 is housed within the stud body 446, a spring 452 is positioned between an end of the locking stud 448 and the locking mechanism chamber 442. The spring 452 drives the locking stud 448 to allow the sliding of a front end of the locking stud 448 to engage the stud hole 415 on the sliding axle chamber 402 while the gear lever locking device 400 is in the locked position.

The position of the axle 422 extending from the sliding axle 404 and the position of the opening 414 is configured such that the axle 422 extends to a corresponding position of a screw that fastens a screw guard 460 onto the second seat unit 412, as further described below. The sliding axle chamber 402 is generally configured to have a cylindrical or box pipe shape.

Figure 23:
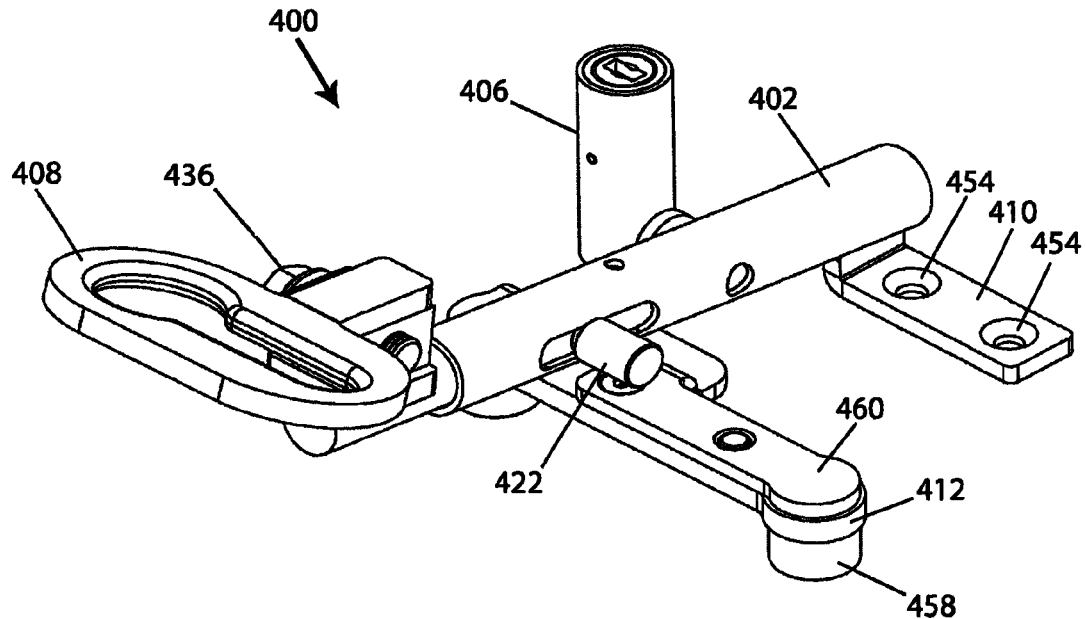
FIG. 23 is a perspective view of the gear lever locking device of FIG. 22.
Figure 24:
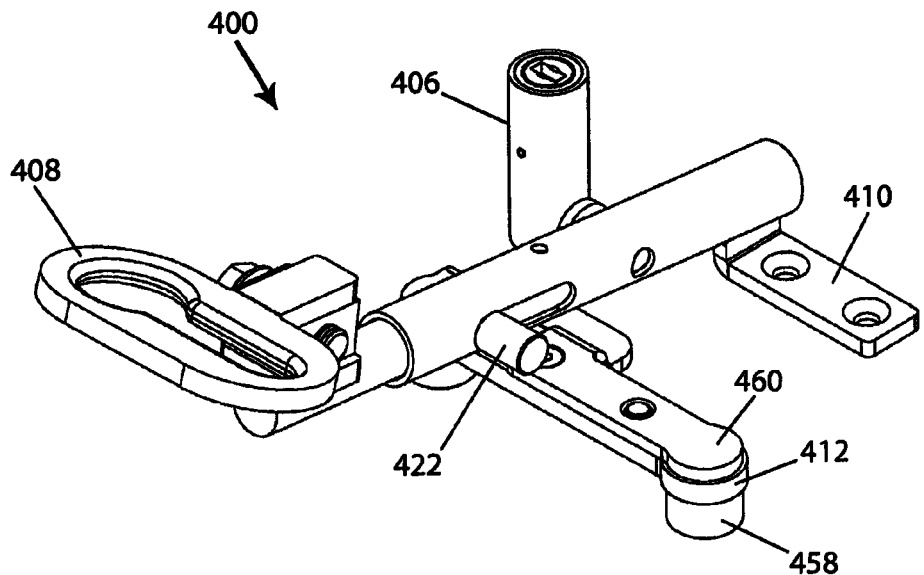
FIG. 24 is another perspective view of the gear lever locking device of FIG. 22.

The first seat unit 410 is configured, as best shown in FIGS. 22 and 23. The first seat unit 410 is a substantially planar member having one end connected to the sliding axle chamber 402 and extending therefrom about a bottom portion of the sliding axle chamber 402. The first seat unit 410 also includes a plurality of throughholes 454 for receiving fasteners therethrough. The overall position of the first seat unit 410 and its throughholes 454 are configured to correspond to the original screw positions of a vehicle's gear lever housing frame (not shown).

The second seat unit 412 is generally configured, as best shown in FIGS. 22 and 23. In general, the second seat unit 412 is a substantially planar and elongated member having circular ends. Each of the circular ends include a through hole 456. The throughholes 456 are configured to receive a screw or other fastener for securing the second seat unit 412 to a vehicle's gear lever housing. In addition, the second seat unit's throughholes 456 are configured to engage with screw chambers 458 to facilitate mounting to the vehicle. The second seat unit 412 is attached to the sliding axle chamber 404 about its bottom portion such that the second seat unit 412 extends from the sliding axle chamber 402, as best shown in FIG. 23. The throughholes 456 of the second seat unit 412 are positioned to correspond to the original screw positions of the vehicles gear lever housing.

The screw guard 460 is configured, as best shown in FIGS. 22 and 23. The screw guard 460 is generally configured to match the overall profile of the second seat unit 412. The screw guard 460 is a planar elongated member having circular ends that correspond in position to the circular ends of the second seat unit 412 so as to provide a cover to the throughholes 456. The screw guard 460 also includes a stepped portion to allow for connection of the second seat unit 412 and the screw guard 460 to the sliding axle chamber 402. Additionally, the screw guard 460 includes throughholes 462 for receiving screws to fasten the screw guard to the second seat unit 412. The throughholes 462 of the screw guard 460 correspond in position to throughholes 462a on the second seat unit 412. At least one of the throughholes 462 used in fastening the screw guard 460 to the second seat unit 412 is positioned directly below the axle 422 that extends through the opening 414 of the sliding axle chamber 402 when the gear lever locking device 400 is in the locked position.

Figure 25:
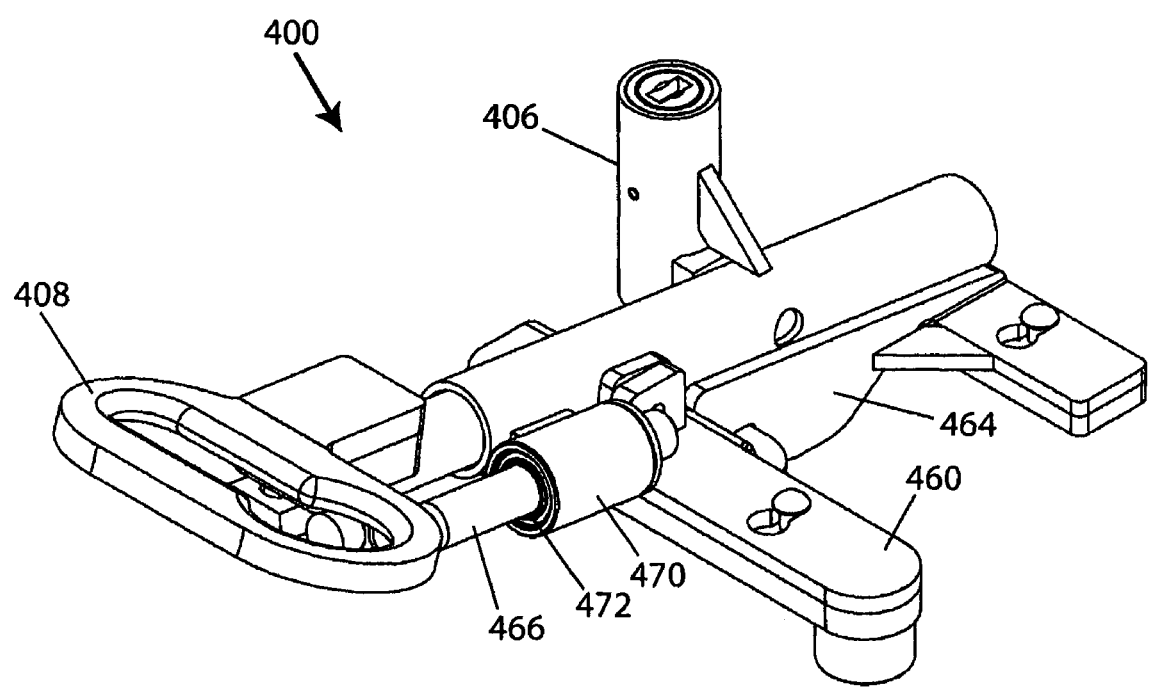
FIG. 25 is a perspective view of an alternative embodiment of the gear lever locking device of FIG. 22.
Figure 26:
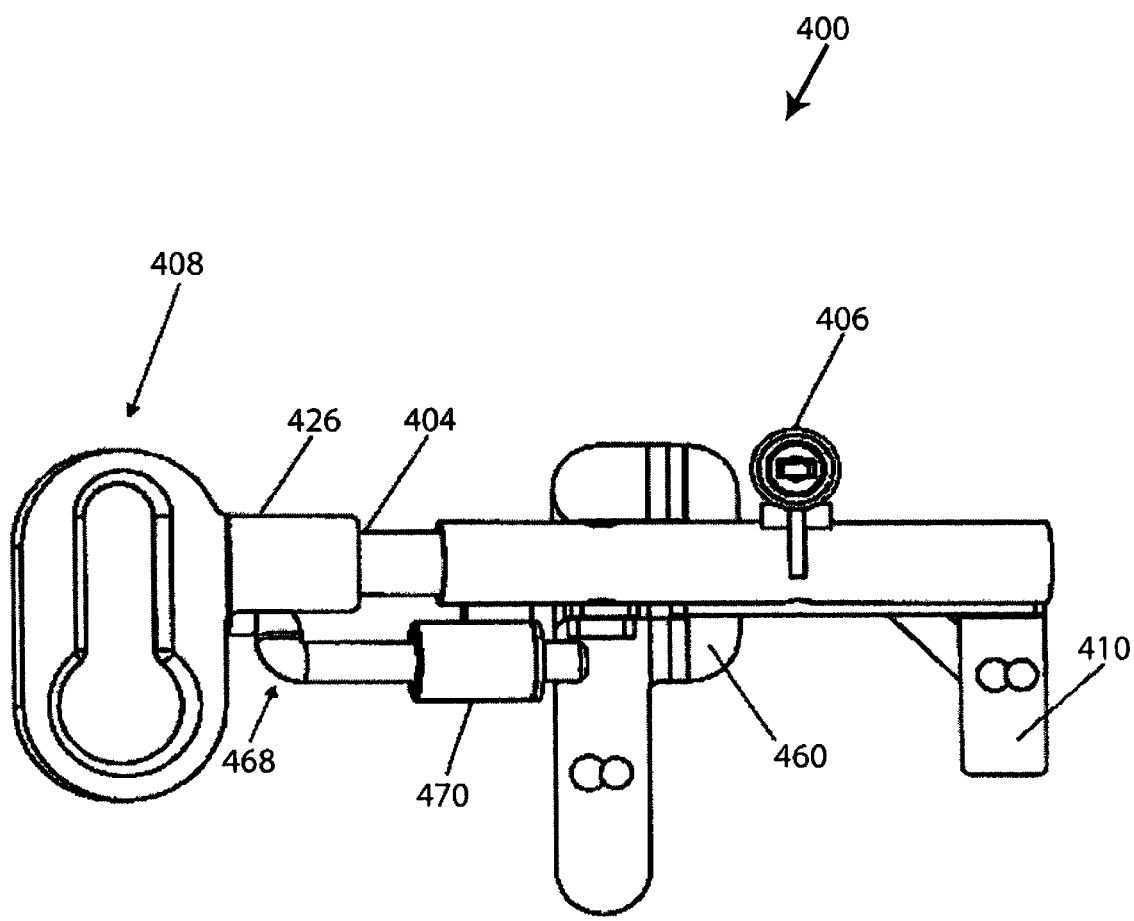
FIG. 26 is a top plan view of the gear lever locking device of FIG. 25.
Figure 27:
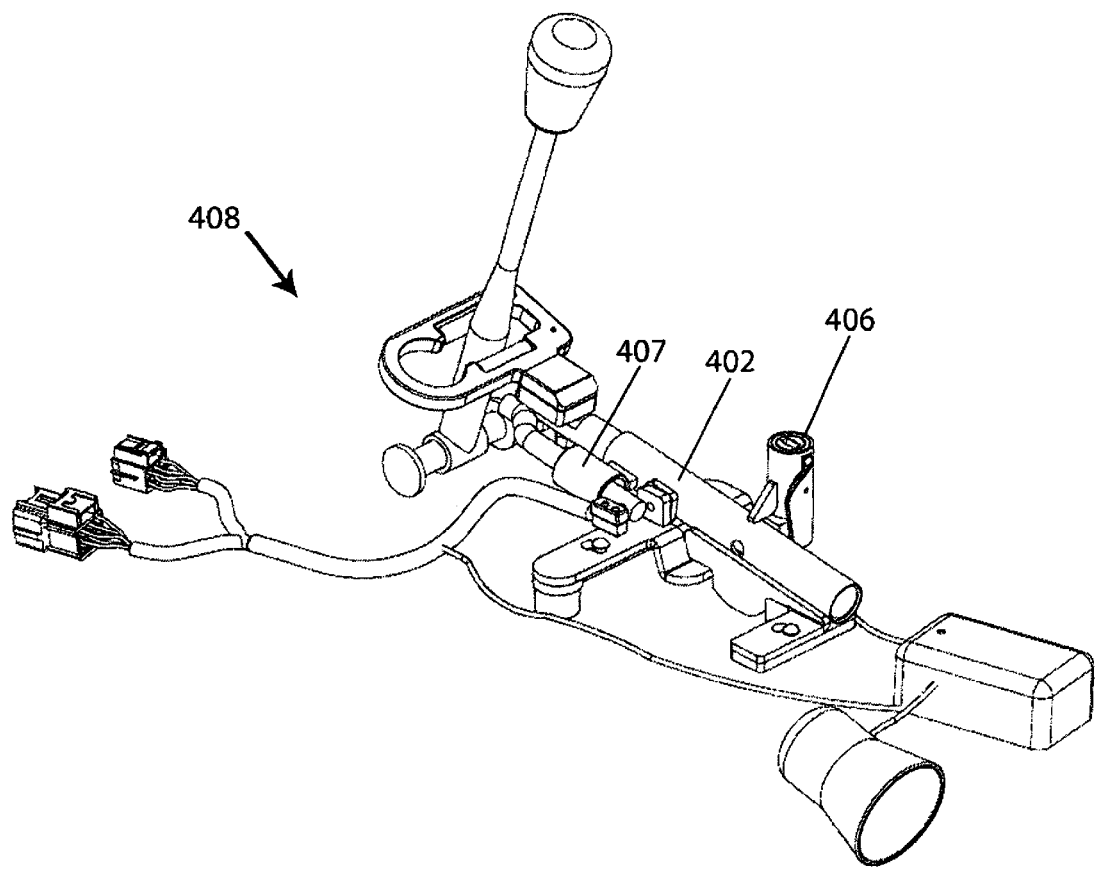
FIG. 27 is a perspective view of the gear locking device of FIG. 25.
Figure 28:
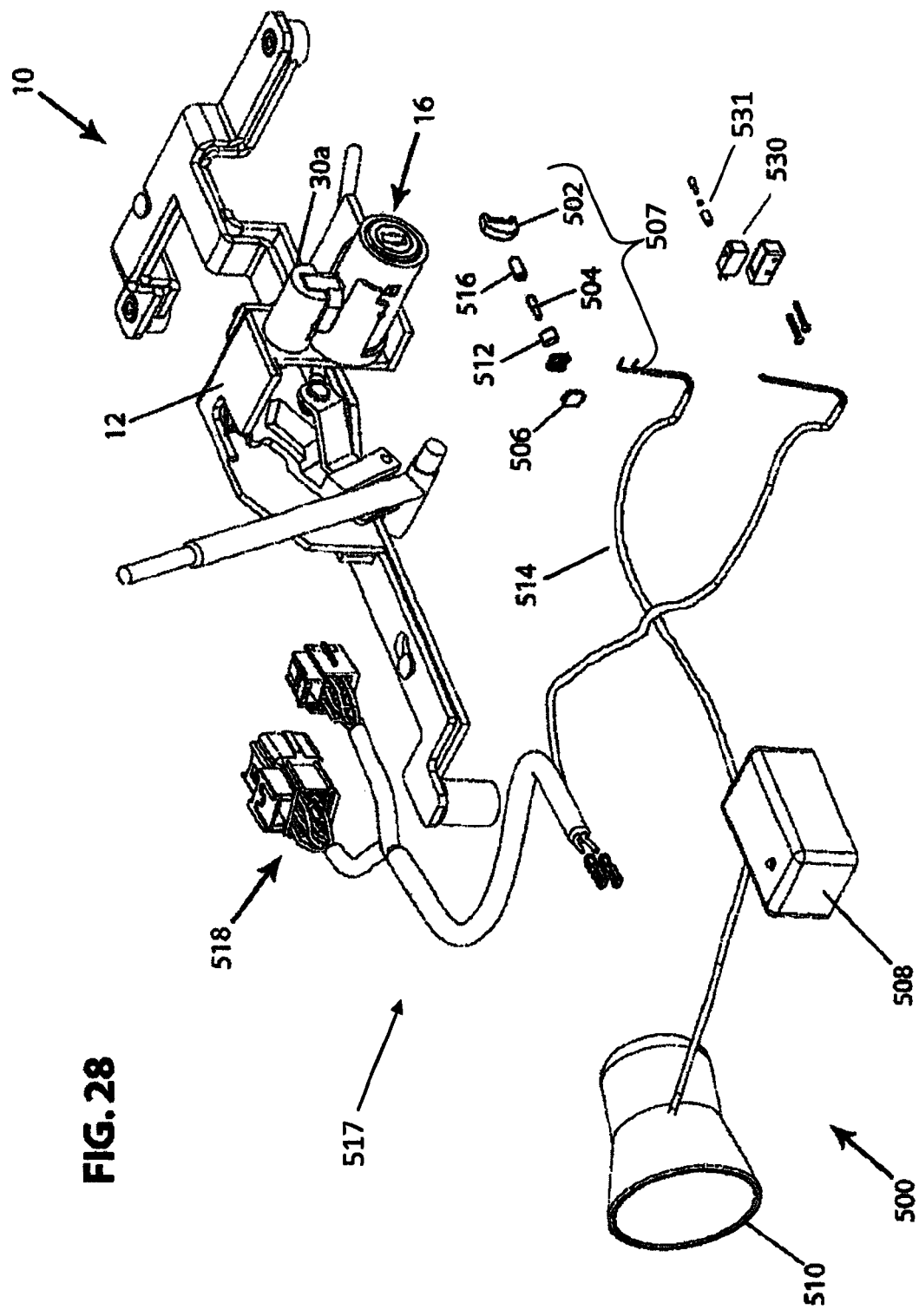
FIG. 28 is a perspective view of an alarm system and anti-start system for use with the gear lever locking device of FIG. 1, in accordance with a fifth preferred embodiment of the present invention.

The sliding axle 404 is configured to have a rod like shape that corresponds to an inside configuration of the sliding axle chamber 402. The gear lever locking device 400 can optionally include a diaphragm 464, as best shown in FIG. 25, that extends downwardly from the sliding axle chamber 402 for closing a gap between the sliding axle chamber 402 and a portion of the vehicle.

In accordance with another aspect of the present embodiment, the gear lever locking device 400 includes a sustaining axle 466 (FIG. 25) which is a bent member having a first end engaged with an end of the sliding axle 404 or the extension member 426 of the gear lever transverse member 408. The sustaining axle 466 includes a second end engaged with a sustaining axle pipe 470 that is fixed to the sliding axle chamber 402 in a position that the end of the sustaining axle 466 can move to block a through hole 462 on the screw guard 460 that receives a screw. In addition, an intermediate pipe 472 is assembled between the sustaining axle 466 and the sustaining axle pipe 470.

In sum, the gear lever locking device 400 includes a sliding axle chamber 402 having a sliding axle 404 which is slidable therein. The locking mechanism unit 406 has a turning mechanism 440, which is turnable by a key inside the locking mechanism chamber 442 attached to the lateral side of the sliding axle chamber 406 for use in driving the locking stud 448 to be locked with the stud hole 415 on the sliding axle chamber 402 and the stud hole 405a or 405b on the sliding axle 404 while the gear lever locking device 400 is in the locked position. The gear lever transverse member 408 is coupled to the other end of the sliding axle 404. Seat units 410, 412 extend from part of the outer wall of the sliding axle chamber 406 to be fastened to the original positions of the screws in the automobile. The gear lever transverse mechanism unit 442 is a loop member inside of which is provided with the transverse aperture 428, one side of which is a circular opening 430. The circular opening 430 is bigger than the lateral slot 432 for use in hooking with the gear lever. The lateral slot 432 has its length corresponding to the range of shifting the gear lever from the first gear to the last gear. The side of the transverse aperture 428 is provided with the extension member 426 to be fastened to the part having a screw fastened to the screw hole on the connector 434 using a screw.

The sliding axle chamber 402 further includes the opening 414 about its lateral side for use with the axle 422 extending from the sliding axle 404 in the position that corresponds to the position of the screw that fastens the screw guard in one position. The sliding axle chamber 402 is shaped into a round or box pipe while the sliding axle 404 is in the form of a rod to match the internal configuration of the sliding axle chamber 402.

The abovementioned locking mechanism is arranged inside the locking mechanism chamber 442 coupled with the lateral side of the sliding axle chamber 402. The locking mechanism 406 comprises a turning mechanism 440 having a turning axle 444 extending to the locking stud 448 provided inside the stud body 446 in the position that the end groove 450 of the stud 448, and the rear end of the stud 448 includes a stud pushing spring 452 for use in driving the stud 448 to allow the sliding of the end to be engaged with the stud hole 415 on the sliding axle chamber 402 and the stud hole 405a or 405b on the sliding axle 404 while the gear lever locking device 400 is in the locked position.

The abovementioned seat units 410, 412 extends from the outer wall on a portion of the sliding axle chamber 402 wherein a number of the seat ends include the cylindrical screw chambers 458 in the positions that correspond to the original positions of the screws in the vehicle for use in fastening the seats to the original screws of the vehicle. The upper seat units 410, 412 include the screw guards 460 cut into the shape that matches the upper part of the seat 412 and fastened to the seat 412 via the screws for use in fastening the screw guards 460. At least one screw is positioned in the lower part and in the correspondent position with the axle 422 when the gear lever locking device 400 is in the locked position.

Referring to FIG. 25, another embodiment of the gear lever locking device according to the present invention is shown comprising a sustaining axle 466. The sustaining axle 466 is a bent member one end of which engaged with the end of the sliding axle 404. The other end is engaged with the sustaining axle pipe 470 fixed to the sliding axle chamber 402 in the position that the end of the sustaining axle 466 can move to obscure the screw fastening the screw guard 460. In addition, there is also an intermediate pipe 472 to prevent the striking between the sustaining axle 466 and the inner part of the sustaining axle pipe 402. This avoids undesired noise from the gear lever locking device 400. At the portion between the seats 410, 412, there is a diaphragm 464 cut into a downwardly protruding shape suitable for closing a lower gap between the sliding axle 404 and the body of the vehicle.

Figure 29:
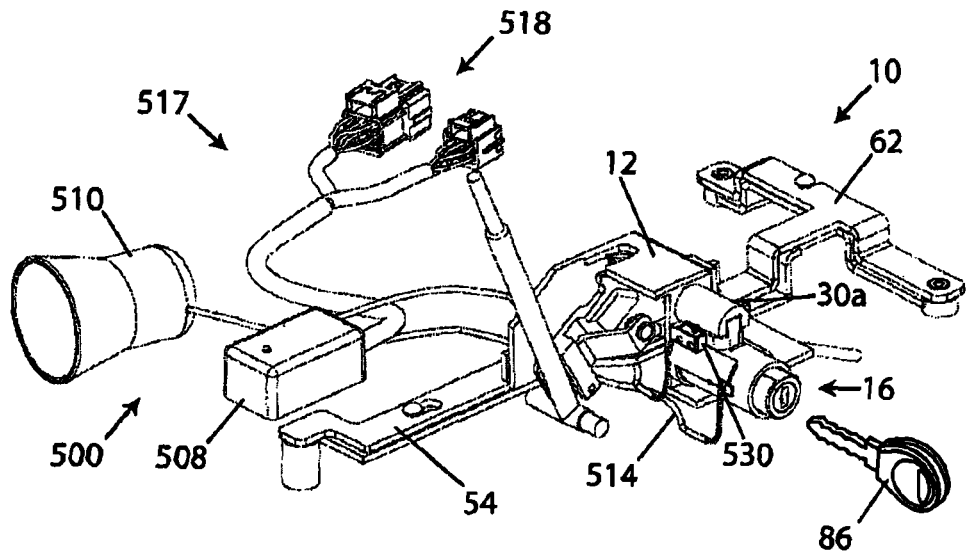
FIG. 29 is a perspective view of the alarm system and anti-start system of FIG. 28.
Figure 30:
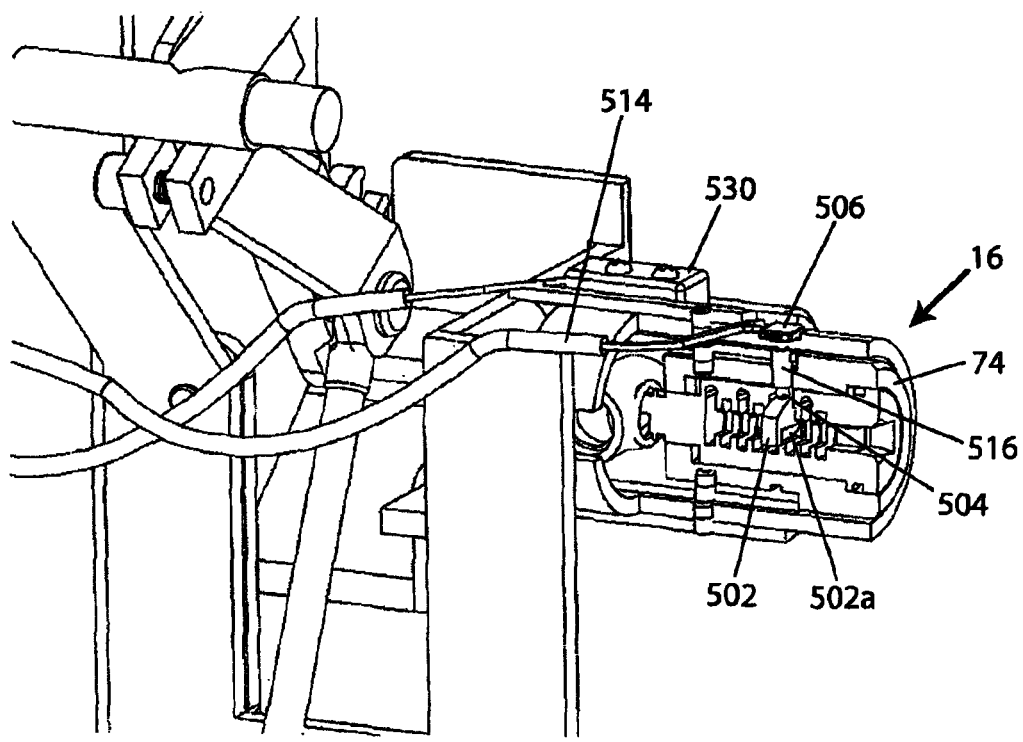
FIG. 30 is an enlarged, partial cut-away view of a locking mechanism connected to the alarm system and anti-start system of FIG. 28.
Figure 31:
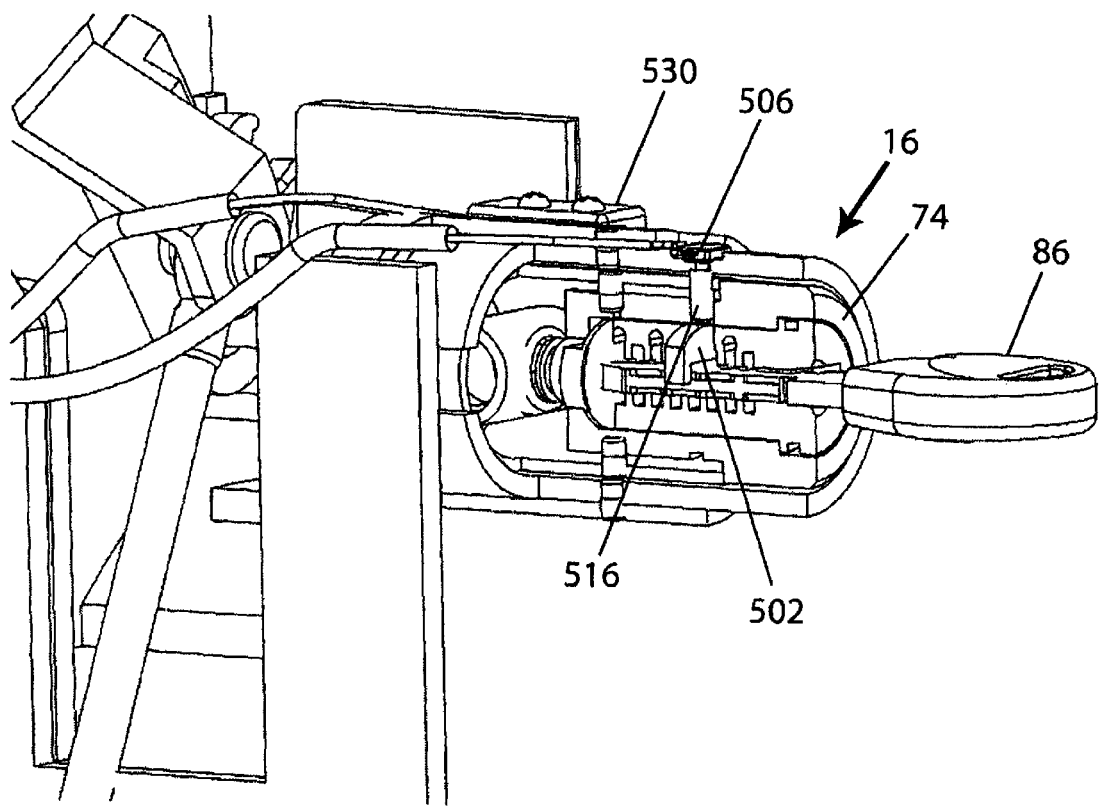
FIG. 31 is an enlarged, partial cut-away view of the locking mechanism of FIG. 30 with a key inserted therein.

Referring to FIGS. 28-32, the above-described embodiments of the gear lever locking device further includes an alarm system 500 and an anti-start system 517. The alarm system 500 and anti-start system 517 are anti-theft/security systems to prevent the vehicle from theft. The alarm system 500 is an electrically supplied system that includes a micro switch set 507, an electronic security system 508, and an audible alarm device 510. The micro switch set 507 is attached via the through hole on the lateral side of the turning mechanism 74 (FIG. 30). The alarm system 500 applicable to the present invention, will now be described with reference to the gear lever locking device 10 described above, however, the alarm system 500 is compatible with any of the above-described embodiments of the gear lever locking device.

The gear lever locking device 10 has a turning mechanism 74 that is turned by the key 86. The turning mechanism 74 is further configured to include the micro switch set 507 having a key code member 502 with a protrusion 504 for use in extending through a through hole to a micro switch 506 (FIG. 30) installed on the body of the locking mechanism 16 when the key 86 is inserted into the locking mechanism 16 for turning and unlocking the gear lever locking device 10. The micro switch 506 is the mechanism used in supplying an electric current to activate the electronic security system 508 of the alarm system 500 to emit a code signal wave to determine a corresponding code signal wave of the key 86 having a signal code storage device attached thereto or embedded therein. If the code signal from the key 86 matches the code signal from the electronic security system 508 installed inside the vehicle, the alarm system 500 will not be triggered to sound the audible alarm device 510. However, if the locking mechanism 16 is unlocked by another different device or if the key 86 does not include the correct code signal that matches the code signal from the electronic security system 508 provided inside the vehicle, the electronic security system 508 will turn on the alarm system 500 and sound the audible alarm to alert the unusual situation.

That is, the aforementioned key code member 502 includes the protrusion 504 to be coupled to a rod 516 used in pressing the micro switch 506 coupled to a return spring 512 (see FIG. 30). The rod 516 extends to the micro switch 506 having a signal wire 514 connected to the electronic security system 508 and a lower portion 502a of the key code member 502 is inclined corresponding with an insertion direction of the key 86. The length of the rod 516 matches the timely distance where the micro switch 506 can operate.

The anti-start system 517 applicable to the present invention, will now be described with reference to the gear lever locking device 10 described above, however, the anti-start system 517 is compatible with any of the above-described embodiments of the gear lever locking device.

Figure 5:
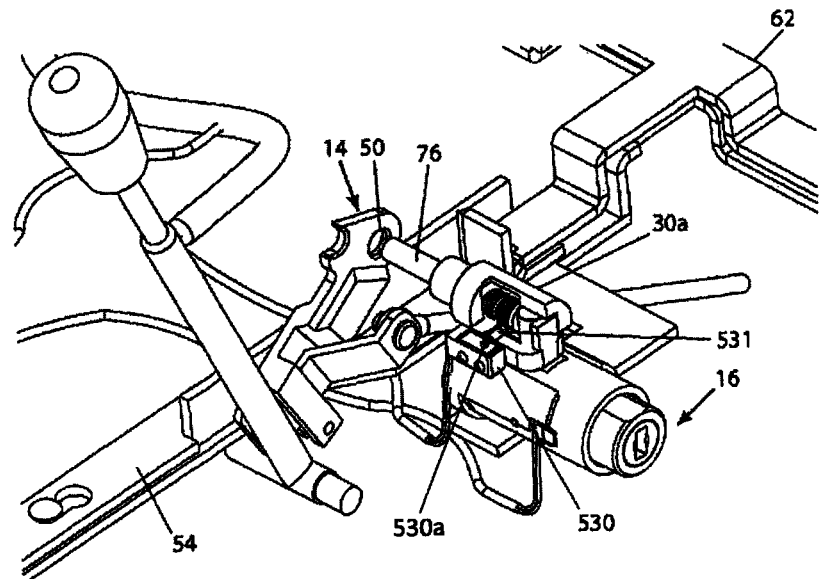
FIG. 5 is a top perspective view of the gear lever locking device of FIG. 1 in the unlocked position.
Figure 6:
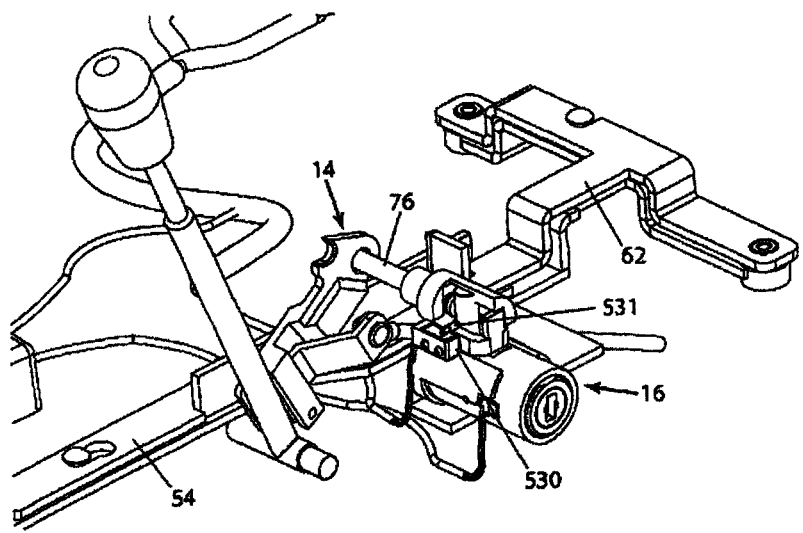
FIG. 6 is a top perspective view of the gear lever locking device of FIG. 1 in the locked position.
Figure 7:
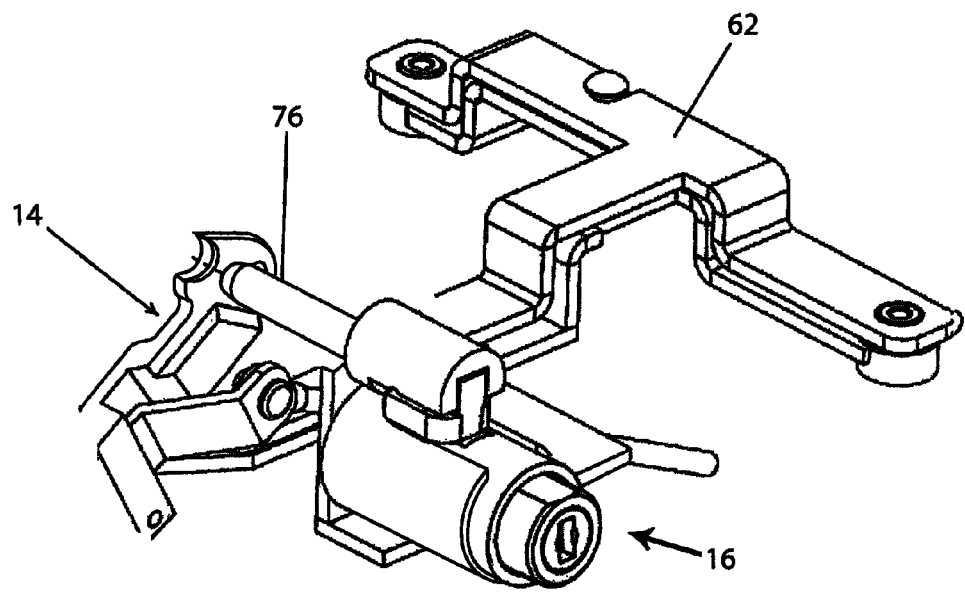
FIG. 7 is a top perspective view of the gear lever locking device of FIG. 1 without a cover element in an unlocked position.
Figure 8:
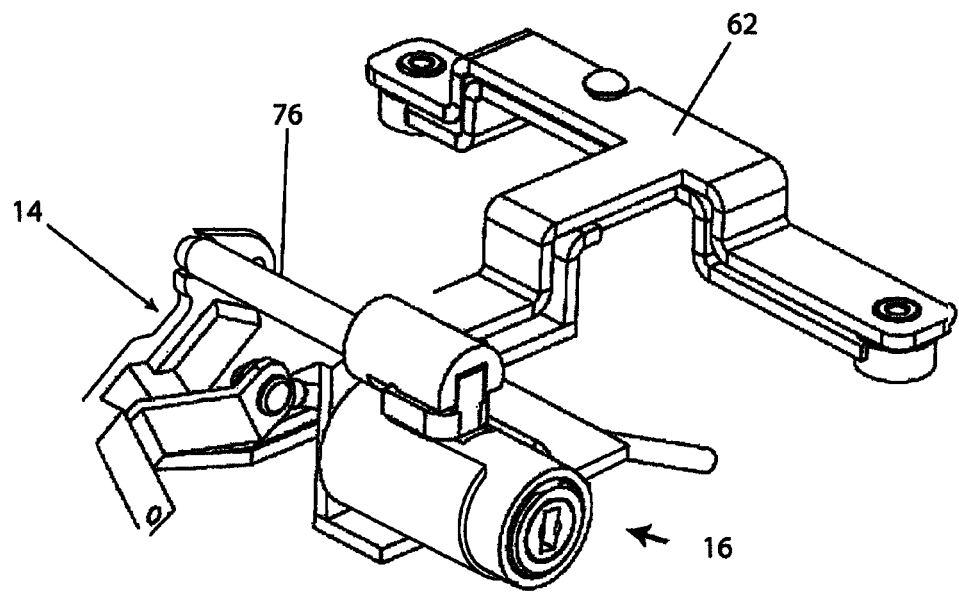
FIG. 8 is a top perspective view of the gear lever locking device of FIG. 1 without a cover element in a locked position.
Figure 9:
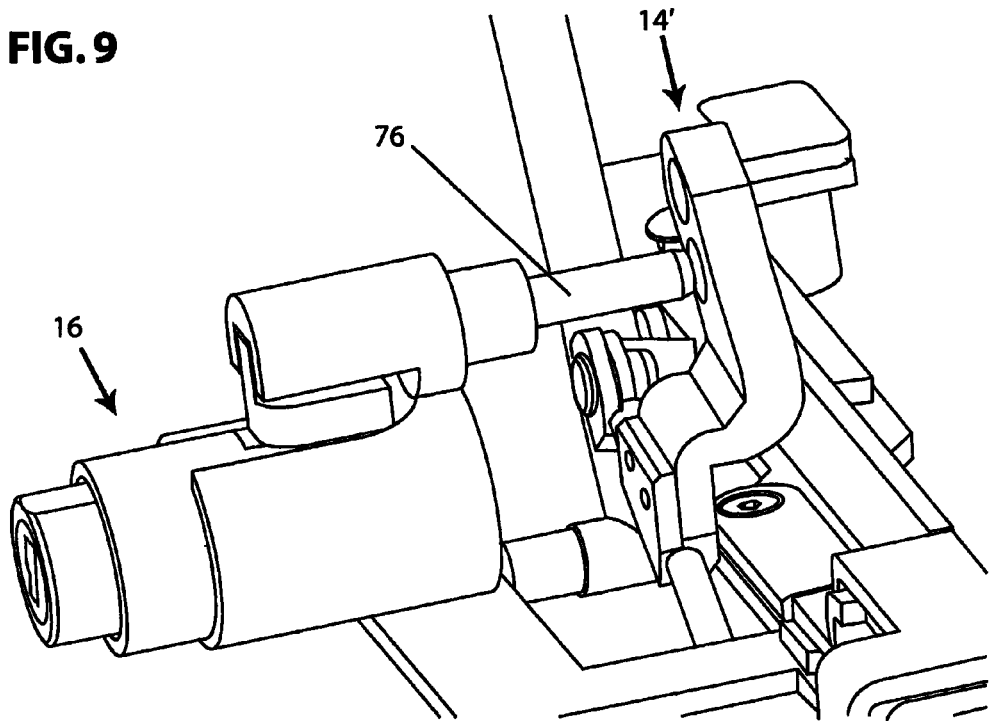
FIG. 9 is an enlarged, rear perspective view of the gear lever locking device of FIG. 1 in an unlocked position.
Figure 10:
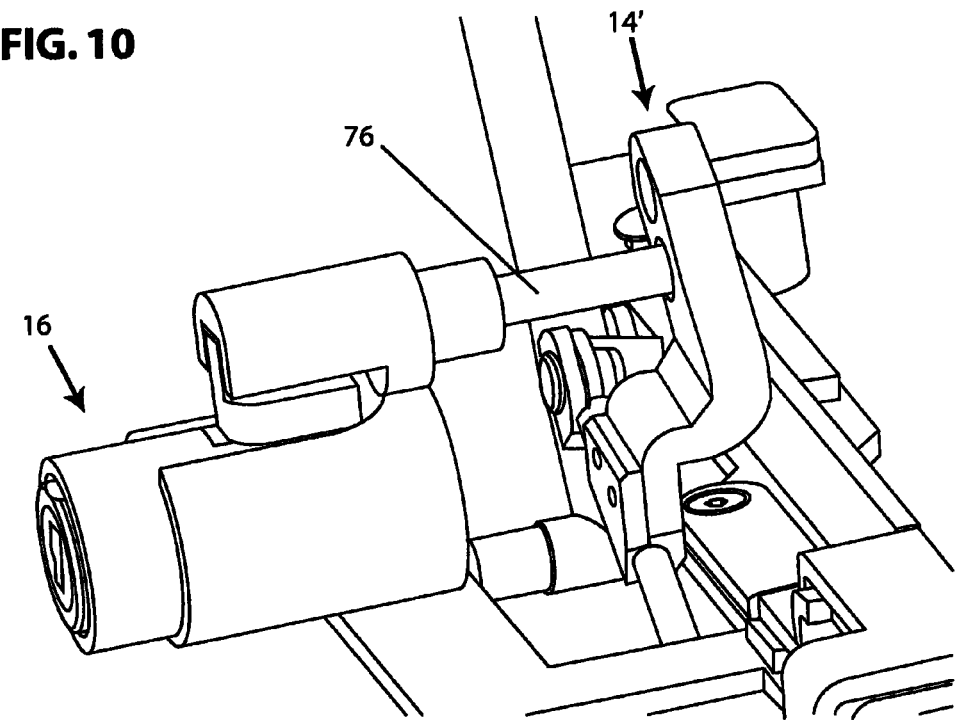
FIG. 10 is an enlarged, rear perspective view of the gear lever locking device of FIG. 1 in a locked position.

The anti-start system 517 serves as an additional or optional anti-theft/security system to protect the vehicle from theft. The anti-start system 517 includes a set of electric wires 518 called a "wire socket". At one end, the wire socket 518 is connected a micro switch 530. At the other end, the wire socket 518 is connected an electric system of the vehicle for supplying electricity, preferably at a position under the steering wheel system of the vehicle. The micro switch 530 is attached on the lateral side of the upper portion 30a of the cover member's cover element 30, as shown in FIGS. 5, 6 and 29. The micro switch 530 includes a switch pressing rod 531 (FIG. 5) attached thereto and protruding through the opening on the lateral side of the cover element 30.

When the gear lever locking device 10 is in the locked position, the first stud 82 (FIG. 1A) will be slid to push against the switch pressing rod 531. The switch pressing rod 531 will slide to push a trigger 530a (FIG. 5) on the micro switch 530. Once the micro switch's trigger is pressed, the electricity supplied to the micro switch 530 will be cut off since an electrical circuit is not completed, thus preventing the vehicle's engine from being started.

The first stud 82 is slid out of the locked position and away from the trigger of the micro switch 530 when the gear lever locking device 10 is moved to an unlocked position, thereby completing the electrical circuit of the micro switch 530. Electricity is then supplied to the anti-start system 517, thereby allowing the engine to start and the regular movement of the gear lever.

Figure 32:
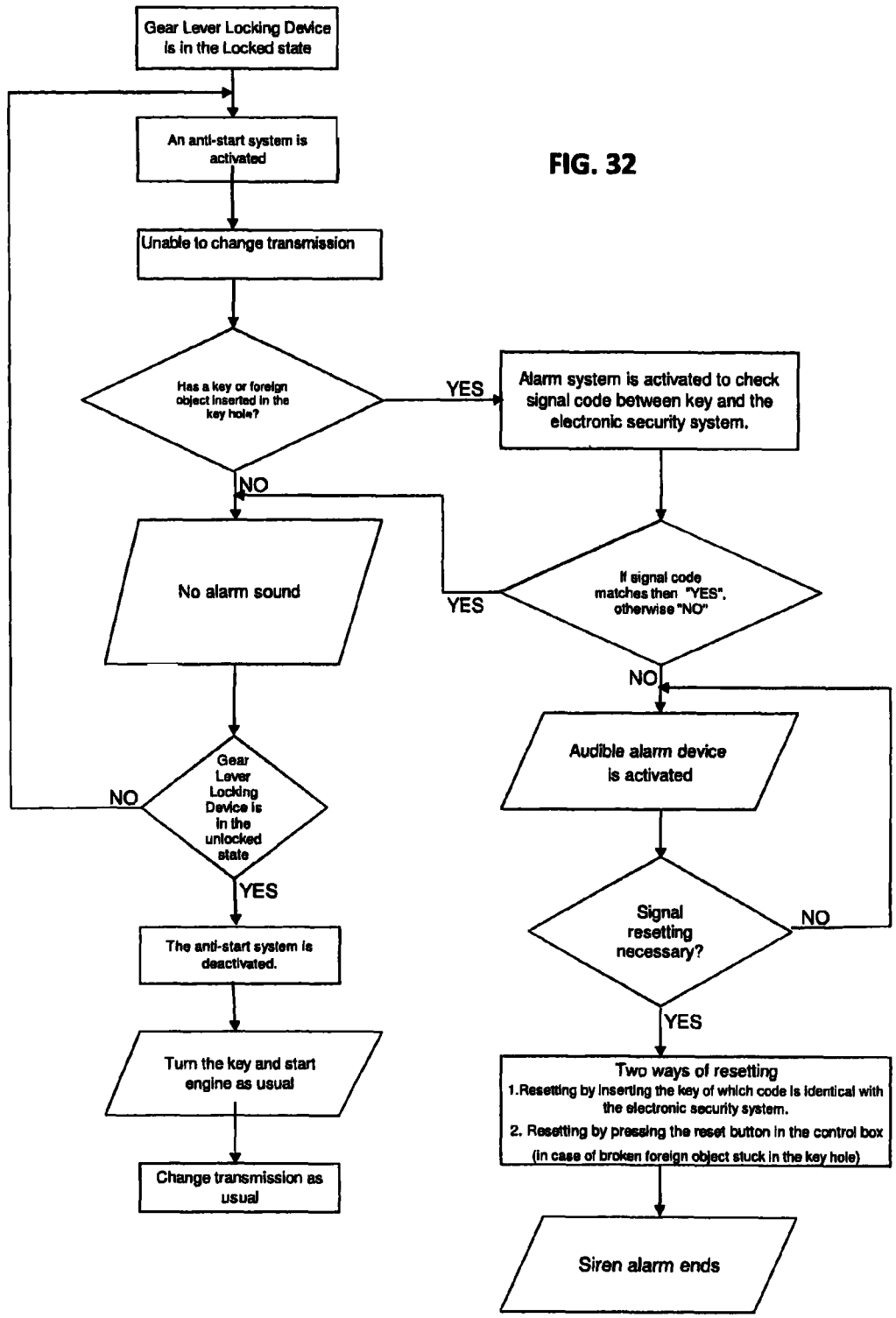
FIG. 32 is a flow diagram of the operational configuration of the alarm system and the anti-start system of FIG. 28.

FIG. 32 shows a flow diagram illustrating the operational configuration of the alarm system 500 and the anti-start system 517. When the gear lever locking device is in a locked state, the switch pressing rod 531 will push the trigger 530a on the micro switch 530 of the anti-start system 517. The supplied electricity to the micro switch 530 will then be cut off since the electrical circuit is not complete. The vehicle's engine cannot then be started. In addition, when the turning mechanism 74 is inserted with the key 86 (FIG. 31) or invaded by some foreign object, the electronic security system 508 will be activated by the micro switch 506 and will transmit the signal wave to determine the code signal stored on a part of the key 86. If the code signal matches the preset one, the alarm system will not be activated. On the other hand, if the code signal does not match the preset one, the alarm system 500 will be triggered and remain active by the electronic security system 508. The aforementioned electronic security system 508 is able to then terminate the alarm system 500 by inserting the key 86 with the correct preset code or pressing the reset button on the electronic security system to reset the security system to the original condition.

Another embodiment of the alarm system can be described as follows. The turning mechanism 74 along with one key code set includes a through hole. The two ends of the through hole are provided with an infrared switch on opposite sides. The infrared switch activates the electronic security system 508 to emit the code signal wave to determine the code signal wave of the key 86 having the signal code storage device attached thereto. If the code signal from the key 86 matches the code signal from the electronic security system 508 installed inside the vehicle, the sound alarm system will not be activated. If it is unlocked by another different device or if the key does not have a code signal that matches the code signal from the security system provided inside the vehicle, the security system will turn on the alarm system to alert the unusual situation.

Each of the components of the above described gear lever locking device embodiments can be made from metal, such as steel or iron, or any other strong material suitable for its intended use, such as a ceramic or composite material. Such materials are known in the art and a detailed description of such suitable materials is not necessary for a complete understanding of the present invention.

It will be appreciated by those skilled in the art that changes could be made to the embodiments described above without departing from the broad inventive concept thereof. For example, additional components and steps can be added to the various gear lever locking devices. It is to be understood, therefore, that this invention is not limited to the particular embodiment disclosed, but it is intended to cover modifications within the spirit and scope of the present invention as defined by the appended claims.

We claim:

1. A gear lever locking device (300) comprising:
an axle pipe (302);
a sliding axle (308), wherein the axle pipe (302) is to be mounted to the sliding axle (308) and a first end (308a) of the sliding axle (308) is curvedly bent, the sliding axle (308) having a tip that includes an engagement member (306) configured to be engaged with a gear lever sling end retaining plate or a gear lever sling end;
wherein a second end (308c) of the sliding axle (308) includes a recess or cutout (308b) in the sliding position corresponding to a P position or a N position of a gear lever to support a locking stud end (310) of a locking mechanism unit (304) extending through a through hole (302a) on the axle pipe (302);
wherein a lower front part of the axle pipe (302) includes a fixing leg (311) comprising a flange (312) and a cast bent screw hole (314) extending downward to be engaged with an original screw of a vehicle, and at a rear end of the flange (312) of the fixing leg (311), there is provided an extension member (316) extending upwardly to be engaged with a portion of the axle pipe (302);
wherein the flange (312) is coupled to a lower part of an upper cover (318) that covers a portion above the front end of the sliding axle (308) to prevent the destruction, and at an other part of the upper cover plate (318), there is a fixing leg (320) extending downwardly;
wherein at the lower part of the second end of the axle pipe (302), there is a fixing leg (322) having a flange (322a) facing downward;
the locking mechanism unit (304) is connected to a lateral portion of the rear end of the axle pipe (302), wherein a lateral part of a fastening stud chamber (324) is connected to the lateral side of the axle pipe (302) on the opposite side of the stud chamber (326);

a turning mechanism (330) with an end pushing stud (328) used in pushing the locking stud when the lock is pressed or the turning mechanism (330) is turned by a key;

at the lateral side of the stud chamber (326), there is a fixing leg (332) extending downwardly, wherein the fixing leg (332) has a flange (332*a*) along with a screw hole (332*b*); and a screw guard (325) is provided on the flange of the fixing leg, wherein at least two ends of the screw guard (325) are bent into a shape that covers the screw heads of the screws, and a portion of the screw guard (325) is bent to be adjoined to the fixing leg (332) and is connected to the fixing leg (332) by a fastener, and one portion on the lateral side of the locking mechanism unit (304) is provided with an extension member (304*a*) extending through the lateral opening (324*a*) used in sliding to cover the screw that fastens the screw guard to prevent the removal of the fixing leg of the gear lever locking device (300) while in the locked position.

2. The gear lever locking device (300) according to claim 1, wherein the engagement member (306) further comprises a hinge member (309) pivotably connecting the engagement member (306) with the sliding axel (308).

3. The gear lever locking device (300) according to claim 1, wherein a portion on the fixing legs (311) further comprises a screw guard (333) used in preventing the removal of a fixing leg fastening screws and connecting to the fixing leg (311) by the screws in a position that a front portion of the second end of the sliding axle (308) slides into a position that covers the screws when the sliding axle (308) is in the corresponding position as the P position or N position while the gear lever locking device (300) is in the locked position.

4. The gear lever locking device (300) according to claim 1, wherein the turning mechanism (330) or a lock pressing mechanism is installed inside the locking mechanism chamber (304) connected to the stud chamber (326) having a stud pushing mechanism (310).

5. The gear lever locking device (300) according to claim 4, wherein the turning mechanism (330) comprises a driving pin used in pushing an end of the stud pushing mechanism (310).

6. The gear lever locking device (300) according to claim 1, wherein the turning mechanism (330) includes a key for use in locking or unlocking the gear lever locking device into the locking or unlocking position, respectively.

7. The gear lever locking device (300) according to claim 1, further comprising at least one of an alarm system and an anti-start system operatively connected to the locking mechanism.

8. The gear lever locking device (300) according to claim 1, further comprising an alarm system (500) that includes:

a micro switch set (507) operatively connected to the turning mechanism (330), the micro switch set (507) having:
   a micro switch (506),
   a key code member (502) that includes a protrusion (504), and
   a rod (516) coupled to the protrusion (504) for engaging the micro switch (506), and an electronic security system (508) connected to the micro switch set (507) by a signal wire (514), wherein the electronic security system (508) is configured to determine if the micro switch set (507) receives a corresponding code signal, and if a noncorresponding code signal is received by the micro switch set (507), the electronic security system (508) activates an audible alarm.

9. The gear lever locking device (300) according to claim 1, further comprising an anti-start system (517) that includes:

a set of electric wires (518) having a first end connected to an electric system of the vehicle for supplying electrical power to the anti-start system, and a micro switch (530) connected to a second end of the set of electric wires (518) opposite the first end and assembled to the locking mechanism (304), the micro switch (530) having:
   a trigger (530*a*), and
   a switch pressing rod (531) configured to engage the trigger, wherein when the trigger (530*a*) is triggered, electrical power to the micro switch (530) is cut off to cut off electrical power to the electrical system of the vehicle.

\* \* \* \* \*